US010325399B2

(12) United States Patent
Ford et al.

(10) Patent No.: US 10,325,399 B2
(45) Date of Patent: Jun. 18, 2019

(54) OPTIMAL TEXTURE MEMORY ALLOCATION

(71) Applicant: Matterport, Inc., Mountain View, CA (US)

(72) Inventors: Daniel Ford, Mountain View, CA (US); Matthew Tschudy Bell, Palo Alto, CA (US); David Alan Gausebeck, Mountain View, CA (US); Mykhaylo Kurinnyy, Milpitas, CA (US)

(73) Assignee: Matterport, Inc., Mountain View, CA (US)

( * ) Notice: Subject to any disclaimer, the term of this patent is extended or adjusted under 35 U.S.C. 154(b) by 0 days.

(21) Appl. No.: 16/015,981

(22) Filed: Jun. 22, 2018

(65) Prior Publication Data
US 2018/0300936 A1 Oct. 18, 2018

Related U.S. Application Data

(63) Continuation of application No. 14/298,816, filed on Jun. 6, 2014, now Pat. No. 10,055,876.

(51) Int. Cl.
*G06T 15/00* (2011.01)
*G06T 15/04* (2011.01)
*G06T 17/20* (2006.01)

(52) U.S. Cl.
CPC ............ *G06T 15/005* (2013.01); *G06T 15/04* (2013.01); *G06T 17/20* (2013.01); *G06T 2200/04* (2013.01); *G06T 2200/28* (2013.01)

(58) Field of Classification Search
CPC ....... G06T 15/00; G06T 15/005; G06T 15/04; G06T 17/20; G06T 2200/04; G06T 2200/28
See application file for complete search history.

(56) References Cited

U.S. PATENT DOCUMENTS

| 6,313,838 | B1 | 11/2001 | Deering |
| 8,311,791 | B1 | 11/2012 | Avisar |
| 8,379,037 | B1 * | 2/2013 | Praun ................ G09G 5/00 345/586 |
| 9,041,711 | B1 | 5/2015 | Hsu |
| 9,311,748 | B2 * | 4/2016 | Schpok ................ G06T 17/05 |

(Continued)

OTHER PUBLICATIONS

Heess, N., et al., "Learning generative texture models with extended Fields-of-Experts," 2009, 11 pages.
(Continued)

*Primary Examiner* — Maurice L. McDowell, Jr.
*Assistant Examiner* — Donna J. Ricks
(74) *Attorney, Agent, or Firm* — Amin, Turocy & Watson, LLP

(57) ABSTRACT

Systems and methods for generating three-dimensional models having regions of various resolutions are provided. In particular, imagery data can be captured and utilized to generate three-dimensional models. Regions of texture can be mapped to regions of a three-dimensional model when rendered. Resolutions of texture can be selectively altered and regions of texture can be selectively segmented to reduce texture memory cost. Texture can be algorithmically generated based on alternative texturing techniques. Models can be rendered having regions at various resolutions.

20 Claims, 12 Drawing Sheets

(56) References Cited

U.S. PATENT DOCUMENTS

| | | |
|---|---|---|
| 2002/0061194 A1 | 5/2002 | Wu et al. |
| 2003/0039408 A1 | 2/2003 | Smith |
| 2003/0193496 A1 | 10/2003 | Wada |
| 2005/0140683 A1 | 6/2005 | Collins et al. |
| 2005/0184997 A1 | 8/2005 | Lake et al. |
| 2011/0075916 A1 | 3/2011 | Knothe et al. |
| 2013/0011069 A1 | 1/2013 | Quan et al. |
| 2013/0117377 A1* | 5/2013 | Miller .................. H04L 67/38 709/205 |
| 2013/0194260 A1 | 8/2013 | Kunath et al. |
| 2013/0321398 A1* | 12/2013 | Howard ................ G06T 19/00 345/419 |
| 2013/0342537 A1* | 12/2013 | Vorhies .................. G06T 5/00 345/428 |
| 2014/0333621 A1 | 11/2014 | Hillesland et al. |
| 2014/0354628 A1* | 12/2014 | Lindberg ............... G06T 19/20 345/419 |
| 2014/0365934 A1* | 12/2014 | Moore ............... G06F 3/04815 715/769 |
| 2015/0161823 A1 | 6/2015 | Anderson-Sprecher et al. |
| 2015/0187082 A1 | 7/2015 | Bernal et al. |
| 2016/0196473 A1 | 7/2016 | Zheng et al. |

OTHER PUBLICATIONS

Office Action for U.S. Appl. No. 14/298,816 dated Aug. 2, 2016, 63 pages.

Final Office Action for U.S. Appl. No. 14/298,816 dated May 3, 2017, 55 pages.

Office Action for U.S. Appl. No. 14/298,816 dated Aug. 24, 2017, 105 pages.

Notice for Allowance for U.S. Appl. No. 14/298,816 dated Aug. 24, 2017, 105 pages.

* cited by examiner

OPTIMAL TEXTURE MEMORY ALLOCATION

CROSS-REFERENCE TO RELATED APPLICATIONS

This application is a continuation of and claims priority to U.S. patent application Ser. No. 14/298,816 filed on Jun. 6, 2014, entitled "OPTIMAL TEXTURE MEMORY ALLOCATION." The entirety of the aforementioned application is incorporated by reference herein.

TECHNICAL FIELD

This disclosure generally relates to systems and methods for allocating texture resolution in a scanned three-dimensional model, and more particularly to reducing texture memory for three-dimensional models.

BACKGROUND

Interactive, first-person three-dimensional immersive environments are becoming increasingly popular. In these environments, a user is able to navigate through a virtual space. Examples of these environments include first person video games and tools for visualizing three-dimensional models of terrain. Aerial navigation tools allow users to virtually explore urban areas in three dimensions from an aerial point of view. Panoramic navigation tools (e.g., street views) allow users to view multiple 360-degree panoramas of an environment and to navigate between these multiple panoramas with a visually blended interpolation.

Three-dimensional immersive environments can be generated based on positional data and texture data. Generally, texture resolutions are globally constant in an automatically generated three-dimensional immersive environment. While resolutions may be constant, various regions of a three-dimensional immersive environment may have little importance to a user or may have little effect on a user's satisfaction with a three-dimensional immersive environment.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems, methods, and apparatuses are disclosed herein to facilitate selective allocating of differing texture resolutions to regions of texture associated with a three-dimensional ("3D") model. Heuristics can be utilized to select regions and allocate texture resolutions for the regions of texture. Regions of texture can be judiciously segmented based on the heuristics.

Resolutions of the regions of texture can be altered to reduce texture memory with little or no loss in visual quality or increase texture memory where it is most needed to convey important detail. Textures can be packed into texture atlases. Regions of a model can be rendered at various resolutions based on the altered texture resolutions, sensory data, and two-dimension ("2D") data.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
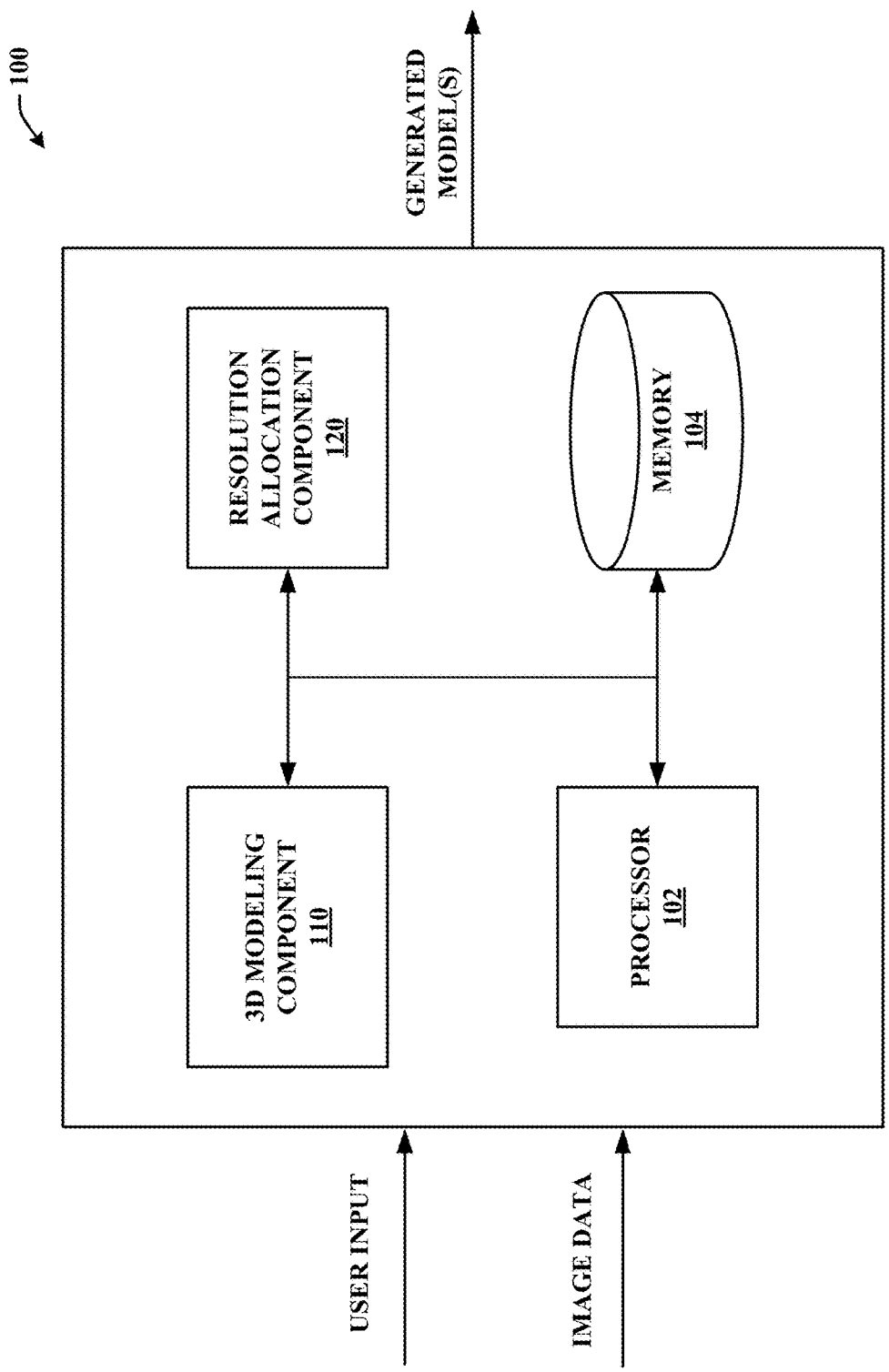
FIG. 1 illustrates a high-level block diagram of an example system that can facilitate allocating resolutions to texture regions and generating 3D models in accordance with certain embodiments of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing this disclosure.

Terms such as "user equipment," "user equipment device," "mobile device," "user device," "handset," or terms representing similar terminology can refer to a device utilized by a subscriber or user to receive data, convey data, control, voice, video, sound, models, gaming, and the like. The foregoing terms are utilized interchangeably herein and with reference to the related drawings.

Furthermore, the terms "user," "subscriber," "customer," "consumer," "end user," and the like are employed interchangeably throughout, unless context warrants particular distinctions among the terms. It should be appreciated that such terms can refer to human entities, human entities represented by user accounts, or automated components supported through artificial intelligence (e.g., a capacity to make inference based on complex mathematical formalisms), which can provide simulated vision, sound recognition and so forth.

Digital 3D models can be generated based on 2D sensory data, 3D sensory data, sensory data in combination with raw 2D data, computer generated positional data, and the like. In an aspect, data used to generate 3D models (e.g., 3D imagery data) can be collected from scans (e.g., utilizing sensors) of real-world scenes, spaces (e.g., houses, office spaces, outdoor spaces, etc.), objects (e.g., furniture, decorations, goods, etc.), and the like. Data can also be generated based on computer implemented 3D modeling systems. In embodiments, a camera or capturing device can capture visual texture data (e.g., spatially varying luminance and color data) at one or more resolutions. A 3D model can utilize the texture data to provide texture to positions, geometric shapes, curved surface, and the like. For example, a 3D model can comprise a collection of points represented by 3D coordinates, such as points in a 3D Euclidean space. The collection of points can be associated with each other (e.g., connected) by geometric entities. For example, a mesh comprising a series of triangles, lines, curved surfaces (e.g., non-uniform rational basis splines ("NURBS")), quads, n-grams, or other geometric shapes can connect the collection of points. In an aspect, texture can be associated with portions of the mesh. The texture can comprise image data (e.g., pixels) describing texture, color, intensity, and the like.

In one or more aspects, a 3D model of an interior environment (e.g., the captured 3D data) can comprise geometric data and/or texture data. The geometric data can comprise data points of geometry in addition to comprising texture coordinates associated with the data points of geometry (e.g., texture coordinates that indicate how to apply texture data to geometric data). For example, a 3D model of an interior environment (e.g., the captured 3D data) can comprise mesh data (e.g., a triangle mesh, a quad mesh, a parametric mesh, etc.), one or more texture-mapped meshes (e.g., one or more texture-mapped polygonal meshes, etc.), a point cloud, a set of point clouds, surfels and/or other data constructed by employing one or more 3D sensors. In one example, the captured 3D data can be configured in a triangle mesh format, a quad mesh format, a surfel format, a parameterized solid format, a geometric primitive format and/or another type of format. For example, each vertex of polygon in a texture-mapped mesh can include a UV coordinate for a point in a given texture (e.g., a 2D texture), where U and V are axes for the given texture. In a non-limiting example for a triangular mesh, each vertex of a triangle can include a UV coordinate for a point in a given texture. A triangle formed in the texture by three points of the triangle (e.g., a set of three UV coordinates) can be mapped onto a mesh triangle for rendering purposes. In an aspect, the captured 3D data can be unsegmented captured 3D data. For example, the captured 3D data can be 3D data that is not partitioned and/or processed after being captured by one or more 3D sensors (e.g., the at least one 3D reconstruction system).

An interior environment (e.g., an indoor environment) can include, but is not limited to, one or more rooms, one or more houses, one or more apartments, one or more office spaces, one or more construction sites, one or more commercial spaces, other living spaces, other working spaces, other environment spaces, interiors of buildings, vehicles, vessels, aircrafts, subways, tunnels, crawl spaces, equipment areas, attics, cavities, etc. Furthermore, an interior environment can include physical objects included in one or more rooms, one or more houses, one or more apartments, one or more office spaces, one or more construction sites, one or more commercial spaces, other living spaces, other working spaces and/or other environment spaces.

It is noted that the terms "3D model," "3D object," "3D display," "3D reconstruction," "3D rendering," "3D construct," and the like are employed interchangeably throughout, unless context warrants particular distinctions among the terms. It should be appreciated that such terms can refer to data representing an object, space, scene, and the like in three dimensions, which may or may not be displayed on an interface. In an aspect, a computing device, such as a graphic processing unit (GPU) can generate, based on the data, performable/viewable content in three dimensions. The terms "3D data," "3D imagery data," and like are employed interchangeably throughout, unless context warrants particular distinctions among the terms and can refer to data utilized to generate a 3D model, data describing a 3D model, and the like.

Embodiments described here may reference a model in a particular mode or view, such as a walking mode, orbital mode, floor plan mode, or the like. However, it is appreciated that each mode can comprise a distinct model. Accordingly, in some embodiments, a mode can be defined as a distinct model with determined available features.

References to "a texture," can represent a collection of image pixels that defines aspects of a particular area or region of an image (e.g., color, intensity, hue, etc.). It is noted that a texture can comprise distinct image channels (e.g., sub-textures). These channels can be separated, layered, or otherwise processed individually or in combination. It is further noted that one or more textures can be combined or packed into an atlas. The atlas can be an image or set of images containing the packed texture fragments. It is noted that an atlas can comprise a rectangular image comprising a set of triangular textures. In some embodiments, padding can be added around boundaries of textures in an atlas. The padding can prevent one texture from bleeding into another texture or a background during rendering.

It is noted that terms such as "atlas," "aggregate image," "aggregate texture image," or "texture summary" and the like are employed interchangeably throughout, unless context warrants particular distinctions among the terms. As above, such terms can represent a collection of texture regions that are combined in one or more images. The combined one or more images can be rectangular, square, or other geometric shapes.

While various embodiments disclosed herein reference "a triangle," "a triangular shape," "a triangular region," or other similar terms are employed interchangeably throughout, unless context warrants particular distinctions among the terms. It is noted that various other regular geometric shapes or irregular geometric shapes can be utilized. As such, it is appreciated that a reference to triangles can also include a reference to quads, polygons with arbitrary numbers of sides, other geometric shapes, or any combination of the above. However, for sake of readability, triangles and similar terms are used to describe the various embodiments of this disclosure.

When a 3D model is rendered, a triangular region of a texture can be mapped onto a 3D triangular shape. In an aspect, the textures can be stored or packed in an atlas (or atlases) and may be stored in texture memory. Thus, texture memory cost can be determined by a number of factors, including resolutions at which textures are stored, efficiency of packing methods, an amount of padding used, and other factors that will be apparent herein. Texture memory or texture size can refer to an amount of memory needed to store textures, atlases, and the like. It is noted that texture memory cost can affect long term storage of a 3D model, an amount of data needed to transmit a 3D model or portion thereof, performance of processing units (e.g., central processing units ("CPUs"), GPUs, graphics cards, etc.), or other storage or performance metrics associated with a 3D modeling system.

A 3D modeling system can generate a 3D model based on captured image data, position data, and the like. The image data can include textures captured or generated at one or more resolutions. In accordance with one or more embodiments described in this disclosure, a resolution allocation component can determine resolutions or sizes of textures. In an aspect, a resolution allocation component can determine a current resolution of a texture and can determine a target resolution for the texture based on one or more heuristics. The texture can be altered to the target resolution and stored at the target resolution. In various embodiments, that the target resolution can be a minimum available resolution, a maximum available resolution, an average resolution, and the like. It is noted that the resolution allocation component can alter resolutions of textures before a 3D model is constructed, after a 3D model is constructed, before textures are created at an initial resolution, after textures are created at an initial resolution, or at various other times. In some embodiments, a resolution allocation component can determine alternative methods of representing color data for various texture regions.

In embodiments, a segmentation component can dynamically segment textures associated with a 3D model to facilitate efficient allocation of a texture memory. Segmenting the textures can comprise determining a set of segments from captured imagery data, rearranging (e.g., combining, dividing, removing, or otherwise altering) segments of an already generated set of segments, and the like. It is noted that segmenting textures can also include configuring or segmenting a 3D mesh. In an aspect, the segmentation component and resolution allocation component can communicate to facilitate the segmenting and resolution allocation.

In some embodiments, a resolution allocation component can pack or aggregate textures into aggregate images (e.g. atlases). The resolution allocation component can group triangular textures to form a rectangular image or set of images (e.g., an aggregate image or an atlas). In an aspect, padding can be added to reduce or eliminate textures of an atlas bleeding into neighboring textures or background.

In accordance with other embodiments described in this disclosure, a 3D modeling method utilizing resolution allocation techniques is described herein. The method can include generating a 3D model based on imagery data. For example, captured 2D images or 3D data can be associated with coordinates of a 3D model based on image or feature matching techniques such as bundle adjustment and other photogrammetry techniques, location data, data from additional sensors such as Inertial Measurement Units (IMUs), and the like.

The method can include selecting, based on a selection criterion, a region of texture for altering. The selected region of texture can be altered through adjusting a resolution, removing pixel data, selecting reconstruction techniques for the selected region (e.g., vertex coloring, pseudo random pattern generation techniques, etc.), or otherwise altering the region. In another aspect, the method can include combining or removing one or more regions of texture.

A packing method can pack regions of texture into an atlas, aggregate image, or texture summary. For example, the method can generate a square image that comprises a set of triangular texture regions. In another example, the method can efficiently pack texture fragments into a square image such that the fragments do not overlap. In various embodiments, the packing method can comprise generating padding around certain regions of texture within an atlas.

In embodiments, a method can include generating a rendering of a 3D model having various regions of texture with various resolutions. In an aspect, regions of texture, having associate resolutions, can be mapped onto 3D regions of a 3D model. The method can iterate generating renderings as a user navigates a 3D model.

In 3D modeling systems, texture data is typically mapped to 3D meshes. In some 3D modeling systems, texture resolution is assigned based on a global resolution, such as one pixel of texture resolution per square millimeter of surface in a 3D model. In other systems, texture resolution is related to the resolution at which the data was originally captured. Contiguous triangles on the mesh often map to contiguous areas of texture on the texture image. Sets of triangles can be assigned to the same texture if they are adjacent to each other and have similar enough normals, such that a map from the vertices of the triangles in the set to the texture involves relatively minimal distortion. In another aspect, traditional 3D modeling systems may inefficiently store textures at higher resolutions than necessary or may increase resolutions of regions of texture with little or no increase on user satisfaction.

In implementations, the components described herein can perform actions online or offline. Online/offline can refer to states identifying connectivity between one or more components. In general, "online" indicates a state of connectivity, while "offline" indicates a disconnected state. For example, in an online mode, models can be streamed from a first device (e.g., server) to a second device (e.g., user device), such as streaming raw model data or in rendered models. In another example, in an offline mode, models can be generated and rendered on one device (e.g., user device), such that the device does not receive data or instructions from a second device (e.g., server).

Some details pertaining to embodiments of the subject disclosure can be found in the following U.S. patent applications that are licensed to the assignee of the present application for patent: application Ser. No. 14/298,370 filed Jun. 6, 2014 and application Ser. No. 14/219,906 filed Mar. 19, 2014, each of which are incorporated by reference herein.

The above-outlined embodiments are now described in more detail with reference to the drawings, wherein like reference numerals are used to refer to like elements throughout. In the following description, for purposes of explanation, numerous specific details are set forth in order to provide a thorough understanding of the embodiments. It may be evident, however, that the embodiments can be practiced without these specific details. In other instances, well-known structures and devices are shown in block diagram form in order to facilitate describing the embodiments.

While the various components are illustrated as separate components, it is noted that the various components can be comprised of one or more other components. Further, it is noted that the embodiments can comprise additional components not shown for sake of brevity. Additionally, various aspects described herein may be performed by one device or two or more devices in communication with each other. In some disclosed aspects, like named components describe different figures and/or embodiments but can perform substantially similar acts and/or functions, unless context suggests otherwise.

Referring now to FIG. 1, a system 100 is depicted. System 100 can allocate resolutions to texture regions and generate 3D models, in accordance with various embodiments disclosed herein. Embodiments disclosed herein, for example, can generate a 3D model, determine resolutions of texture data, alter resolutions of texture data, facilitate efficient allocation of texture data cost, and the like. Such embodiments can facilitate improved 3D modeling systems, increase efficiency of 3D modeling systems, improve user satisfaction, and provide other benefits that will be apparent herein.

System 100 can primarily include a memory 104 that stores computer executable components and a processor 102 that executes computer executable components stored in the memory 104. It is to be appreciated that the system 100 can be used in connection with implementing one or more of the systems or components shown and described in connection with other figures disclosed herein. It is noted that all or some aspects of system 100 can be comprised in larger systems such as servers, computing devices, smart phones, tablets, personal computers, cameras, and the like. As depicted, system 100 can include communicably coupled components primarily comprising a 3D modeling component 110 (which can generate 3D models and facilitate rendering 3D models) and resolution allocation component 120 (which can determine allocated resolutions for textures associated with a 3D model).

System 100 can receive input to facilitate generation of 3D models comprising 3D imagery data and 2D imagery data. For example, system 100 can receive raw 2D imagery data, sensory data, 3D imagery data, and the like. In some embodiments, system 100 can receive a fully or partially generated 3D model. It is noted that system 100 can receive input, for example, from a capturing device, sensors, a memory store (e.g., database, storage medium, cloud storage, memory 104, etc.), a user(s) (e.g., a user interacting with an interface), and the like.

3D modeling component 110 can facilitate generation of 3D models. In some embodiments, 3D modeling component 110 can generate a 3D model based on 3D imagery data, such as a set of points, a geometric mesh, color data, capturing data (e.g., camera speed, rotation, camera type, etc,), position data, and the like. In an aspect, 3D modeling component 110 can determine position data based on a global satellite positioning (GPS) system, triangulation (e.g., access point triangulation), gyroscope data, motion sensors, accelerometer (e.g. a 3-axis accelerometer), IMU, trilateration system (e.g., GPS or a local arrangement of signal emitters), visual odometry calculation, physical odometry measurement, augmented reality markers, or any variety of a combination of the aforementioned or other technologies. Physical measurements of absolute scale may also be taken. The time of each 3D scene capture may also be determined. Rough estimation of camera movement may be computed using various methods such as optical flow or 2D or 3D feature tracking. This information may be used to provide additional clues about alignment when determining automatic alignment of 3D scenes.

3D modeling component 110 can generate textures based on various techniques. For example, appearance data may be projected onto the 3D model, and then texture geometries from sections of the model may be projected onto a flat 2D image. Pixels can be assigned to the texture geometries based on the projection. Once assigned a texture mapping to the model, the textures can be rendered onto 3D regions of a mesh at render time, for example by a graphics card.

3D modeling component 110 can identify as well as determine positions of objects, barriers, flat planes, architectural elements, and the like. For example, based on 3D imagery data, 3D modeling component 110 can identify barriers, walls, objects, (e.g., counter tops, furniture, etc.), architectural elements, or other features of the 3D imagery data and can determine positions and orientations within a 3D model.

Identification of architectural elements can include identifying flat surfaces associated with the captured 3D data (e.g., mesh). Flat surfaces can be characterized by 2D regions on a plane. Flat surfaces can include walls, floors, and/or ceilings associated with the captured 3D data. In one example, 3D modeling component 110 can identify walls, floors, and/or ceilings in captured 3D data by identifying planes within a mesh. Planes that comprise a particular size and/or a particular angle (e.g., an angle corresponding to walls, floors, or ceilings) can be identified as walls, floors, and/or ceilings (e.g., a flat surface, a prominent plane, etc.). For example, 3D modeling component 110 can identify and/or segment a portion of the captured 3D data that corresponds to a constant (e.g., relatively constant) surface normal as a flat plane. Additionally or alternatively, the 3D modeling component 110 can identify a portion of the captured 3D data (e.g., a section of a mesh) that corresponds to a particular flat surface and/or associate the portion of the captured 3D data (e.g., a section of the mesh) with the particular flat surface.

In another aspect, 3D modeling component 110 can identify non-flat surfaces (e.g., curved surfaces) associated with the 3D imagery data. A non-flat surface can include, but is not limited to, a cylinder, a sphere, convex or concave surface, etc. 3D modeling component 110 can employ a parameterization associated with a non-flat surface (e.g., a curved surface) to fit a curved surface to the 3D model. Additionally, the 3D modeling component 110 can employ a parameterization associated with a non-flat surface to identify and/or segment a non-flat surface as described above with regard to a flat surface.

In one or more embodiments, 3D modeling component 110 can identify objects such as paintings, furniture, or other objects that may be found attached to surfaces such as walls, floors, and ceilings. The objects can be segmented out from the rest of a surface. In another example, objects that are not part of a surface can be identified and located. For example, multiple objects may be joined based on various characteristics such as having sections of boundaries in very close proximity to one another, having a visual appearance (e.g., hue or texture) that match neighboring regions, and the like. Some embodiments of the foregoing can be found in application Ser. No. 14/298,370.

In an aspect, 3D modeling component 110 can generate a mesh comprising a series of triangles, lines, curved surfaces, NURBS, quads, n-grams, or other geometric shapes that connect a collection of points of 3D imagery data. In an aspect, texture can be associated with portions of the mesh. The texture can comprise image data describing texture, color, intensity, and the like.

3D modeling component 110 can map texture data of 3D imagery data onto 3D shapes or 3D meshes. In various embodiments, textures can be received from a capturing device, a memory store, or the like. It is noted that 3D imagery data can comprise multiple regions of texture associated with a common position and 3D modeling component 110 can generate multiple 3D models having varying resolutions.

Resolution allocation component 120 can judiciously allocate or assign resolutions to regions of texture. For example, resolution allocation component 120 can analyze a region of texture and determine a current resolution of the texture. The resolution allocation component 120 can then determine, based on one or more heuristics, a target resolution for the region of texture. The region of texture can be altered to the target resolution. In another embodiment, resolution allocation component 120 can compare multiple textures corresponding to a 3D region (e.g., a triangle or a cluster of contiguous triangles). These textures may be associated with one or more resolutions. For example, a camera(s) can capture textures at different resolutions. Thus, in some embodiments altering a resolution can comprise appropriate selection of a texture having a determined resolution.

In embodiments, the target resolution can be a lower or reduced resolution with respect to the current resolution. In another embodiment, the target resolution can be a higher resolution, as will be described below. In yet another embodiment, resolution allocation component 120 can determine not to utilize texture data for a region. For example, resolution allocation component 120 can determine to utilize computer generated shading or texturing techniques, such as vertex coloring, to texture a particular region of a 3D mesh. Determining to utilize computer generated shading or texturing techniques for a particular region can forgo the need to store texture for the particular region.

Altered textures can be stored in a memory (e.g., memory 104) along with original textures. In an aspect, the altered textures or original textures can be utilized to facilitate generating a 3D model with textures at various resolutions. In another aspect, the altered textures can reduce an amount of memory need to store various regions of texture or can enhance a selected region. It is noted that textures can be stored or aggregated into a texture atlas. In an aspect, resolution allocation component 120 can reduce a size (e.g., amount of memory) needed to represent a texture atlas.

In embodiments, resolution allocation component 120 can partition or segment imagery data to facilitate resolution allocation. In an aspect, as described in more detail below, the partitioning can occur simultaneously with generating a mesh or assigning textures to partitioned regions. In another aspect, partitioning can occur after 3D modeling component 110 generates the mesh. Partitioning can include partitioning textures into segments or regions of texture, rearranging (e.g., combining, dividing, removing, or otherwise altering) segments of an already generated set of segments, and the like. In an aspect, partitioning texture and allocating resolution can occur simultaneously or substantially simultaneously.

It is noted that various embodiments disclosed herein can alter texture regions at various times or at various phases of generating, rendering, or providing 3D models. In some embodiments, resolution allocation component 120 can alter textures during a capturing process. In other embodiments, resolution allocation component 120 can alter textures after 3D modeling component 110 generates a 3D model or prior to generating a 3D model. In various other embodiments, resolution allocation component 120 can alter texture regions upon system 100 receiving a request to access a 3D model (e.g., user input indicating the user desires to download, stream, or otherwise access the 3D model) or a request to utilize resolution allocation methods described herein.

Various heuristics or criterions can be utilized to determine whether to alter resolution of texture regions, what resolution to alter a texture region to, whether to utilize computer generated texture techniques, how to partition a 3D mesh or texture regions, and the like. While many situations and factors are disclosed below, it is appreciated that system 100 can utilize other heuristics or criterions for other situations or factors. Furthermore, system 100 can be configured based on predetermined settings, dynamically determined settings, user input, or the like.

In one or more embodiments, the resolution allocation component 120 can assign resolution and/or segment texture regions based one or more of: a determined frequency domain of a region, subjective or objective interest, user input, detected architectural elements, distance from viewpoints or likely viewpoints of a model, image quality metrics of a region (e.g., capture resolution, level of visual detail, etc.), size or number of texture regions, identification of a pattern, identification of semi-random or random patterns, any combination of the above, and various other factors.

In embodiments, resolution allocation component 120 can automatically and dynamically assign a rank or score to resolutions and/or portions based on probability models, inference models, artificial intelligence models, and the like. For example, resolution allocation component 120 can utilize a dynamic Bayesian network such as a Hidden Markov Model (HMM) using a Viterbi algorithm. Resolution allocation component 120 can select appropriate resolutions or segmentations based on a rank or score. For example, a HMM can be configured for a feature (e.g., distinguishable portion of an image) emphasis, scene/composition emphasis, image quality emphasis (e.g., resolution, sharpness, contrast, color saturation, noise), efficiency emphasis, distance emphasis, or emphasis based on one or more selection criterions described herein such that comparison, scoring according to a metric, segmentation, or resolution allocation occur simultaneously or substantially simultaneously.

In another example, resolution allocation component 120 can use a variety of suitable artificial intelligence (AI)-based schemes as described supra in connection with facilitating various aspects of the herein described invention. For example, a process for learning explicitly or implicitly how to segment or assign resolutions can be facilitated via an automatic classification system and process. Inferring or learning can employ a probabilistic or statistical-based analysis to infer an action that is to be executed. For example, a support vector machine (SVM) classifier can be employed. Other learning approaches include Bayesian networks, decision trees, and probabilistic classification models providing different patterns of independence can be employed. Learning as used herein also is inclusive of statistical regression that is utilized to develop models of priority.

As will be readily appreciated from the subject specification, the subject innovation can employ learning classifiers that are explicitly trained (e.g., via a generic training data) as well as implicitly trained (e.g., via observing user behavior, receiving extrinsic information) so that the learning classifier is used to automatically determine according to a predetermined criteria which action to take. For example, SVM's can be configured via a learning or training phase within a learning classifier constructor and feature selection module. A learning classifier is a function that maps an input attribute vector, k=(k1, k2, k3, k4, kn), to a confidence that the input belongs to a learning class—that is, f(k)=confidence(class).

Figure 2:
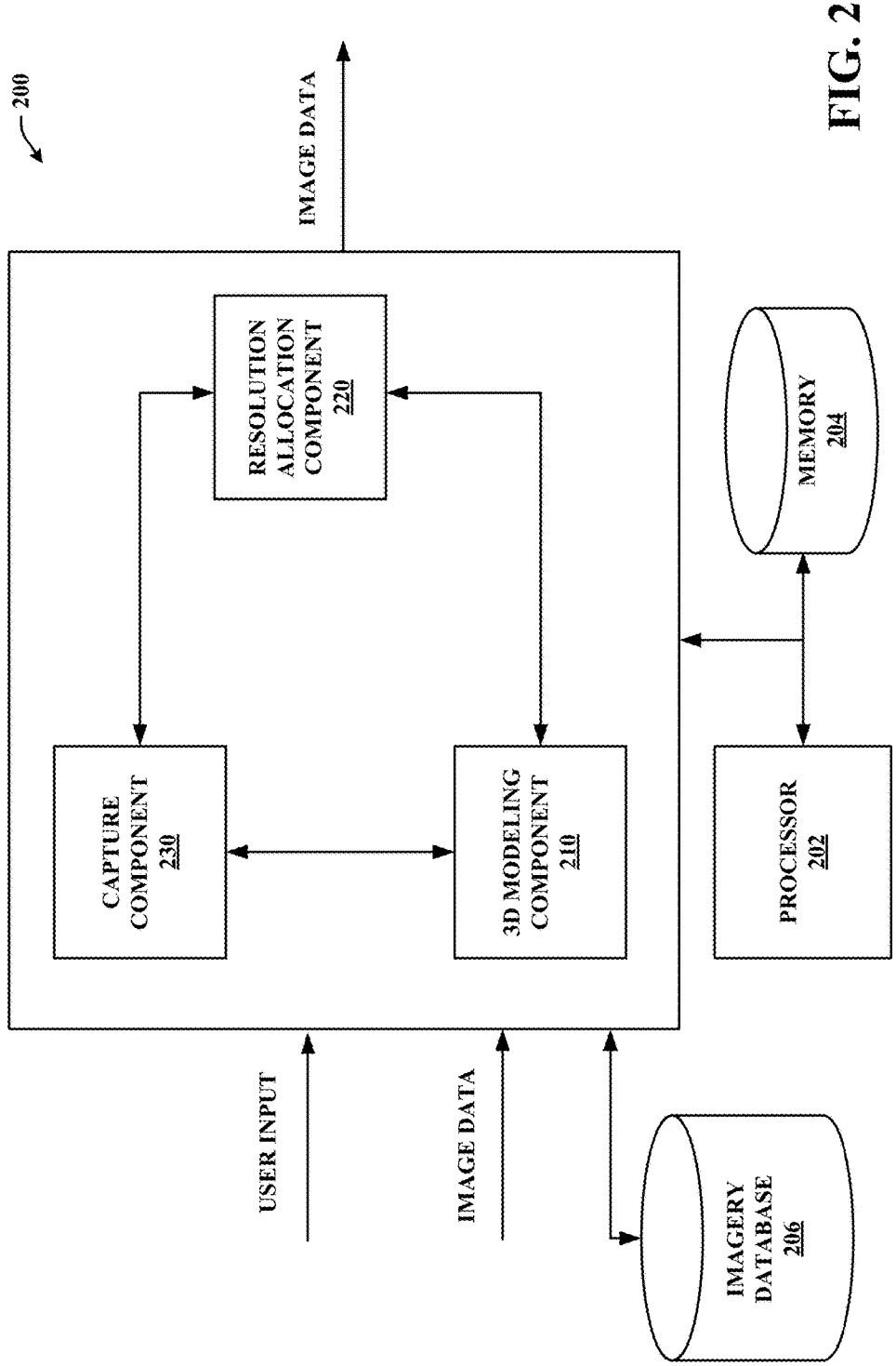
FIG. 2 illustrates a high-level block diagram of an example system that can facilitate capturing media content, allocating resolutions for various portions of texture, and generating 3D models in accordance with certain embodiments of this disclosure.

Turning now to FIG. 2, a system 200 is depicted. System 200 can capture media content, allocate resolutions for various portions of texture, and generate 3D models, in accordance with various embodiments disclosed here. System 200 can include a memory 204 that stores computer executable components and a processor 202 that executes computer executable components stored in the memory 204. It is to be appreciated that the system 200 can include various components described with reference to other systems or can be used in connection with implementing one or more of the systems or components shown and described in connection with other figures disclosed herein. It is further noted that all or part of system 200 can be included within larger systems, such as cameras, tablet computers, smart phones, laptop computers, desktop computers, personal digital assistants (PDA's), and the like. System 200 can also include an imagery database 206 (which stores 3D models and associated data). While system 200 is described as including imagery database 206, it is noted that system 200 can include other databases, or additional databases.

As depicted, system 200 can include communicably coupled components primarily comprising 3D modeling component 210 (which can generate 3D models based on captured media), resolution allocation component 220 (which can allocate resolutions to regions of texture), and capture component 230 (which can facilitate capturing media content or sensory data). It is noted that 3D modeling component 210 and resolution allocation component 220 can respectively function similarly to 3D modeling component 110 and resolution allocation component 120.

Capture component 230 can receive data from one or more image capturing devices or can comprise one or more image capturing devices. Capturing devices can comprise 2D camera devices, 3D camera systems, sensors, and the like. For example, capturing devices can comprise hardware such as light detection and ranging (LIDAR) sensors, capture devices that not only capture color and depth but that are also inexpensive, such as the PrimeSense™ Ltd. hardware in Microsoft Corporation's Kinect™, hand-held laser line scanners, structured light projectors paired with cameras such as the Microsoft® Kinect, other structured light systems, stereo cameras with software for depth derivation, stereo cameras paired with pattern projection systems as well as software for depth derivation, time-of-flight cameras, video cameras capable of structure-from-motion calculations, and lightfield cameras. It is further noted that multiple capture devices may be combined or a capture device may be paired with a color camera to provide color detail for the captured information. Captured media or sensory data can be stored in imagery database 206. In an aspect, stored media or sensory data can be stored for later processing.

In an embodiment, resolution allocation component 220 can allocate or assign resolutions concurrently with capturing media or sensory data, substantially concurrently with capturing media or sensory data, after capturing media or sensory data, and the like. For example, capture component 230 can identify architectural structures, areas of interest (e.g., high interest, normal interest, low interest, etc.), areas of repeating patterns, or various other aspects of media or sensory data. As capture component 230 identifies various aspects or in response to identifying various aspects of media or sensory data, resolution allocation component 220 can determine resolutions of texture data for the various aspects.

In some embodiments, resolution allocation component 220 can allocate or assign resolutions during or in response to 3D modeling component 210 generating a 3D model. For example, in some embodiments, 3D modeling component 210 can identify architectural structures, areas of interest (e.g., high interest, normal interest, low interest, etc.), areas of repeating patterns, or various other aspects of media or sensory data. It is noted that 3D modeling component 210 can identify the various aspects based on input received from capture component 230 or based on various identification techniques. During a 3D model generation process, 3D modeling component 210 can generate meshes, texture regions, atlases, or the like. Resolution allocation component 220 can determine or alter resolutions for textures associated with various identified aspects.

Figure 3:
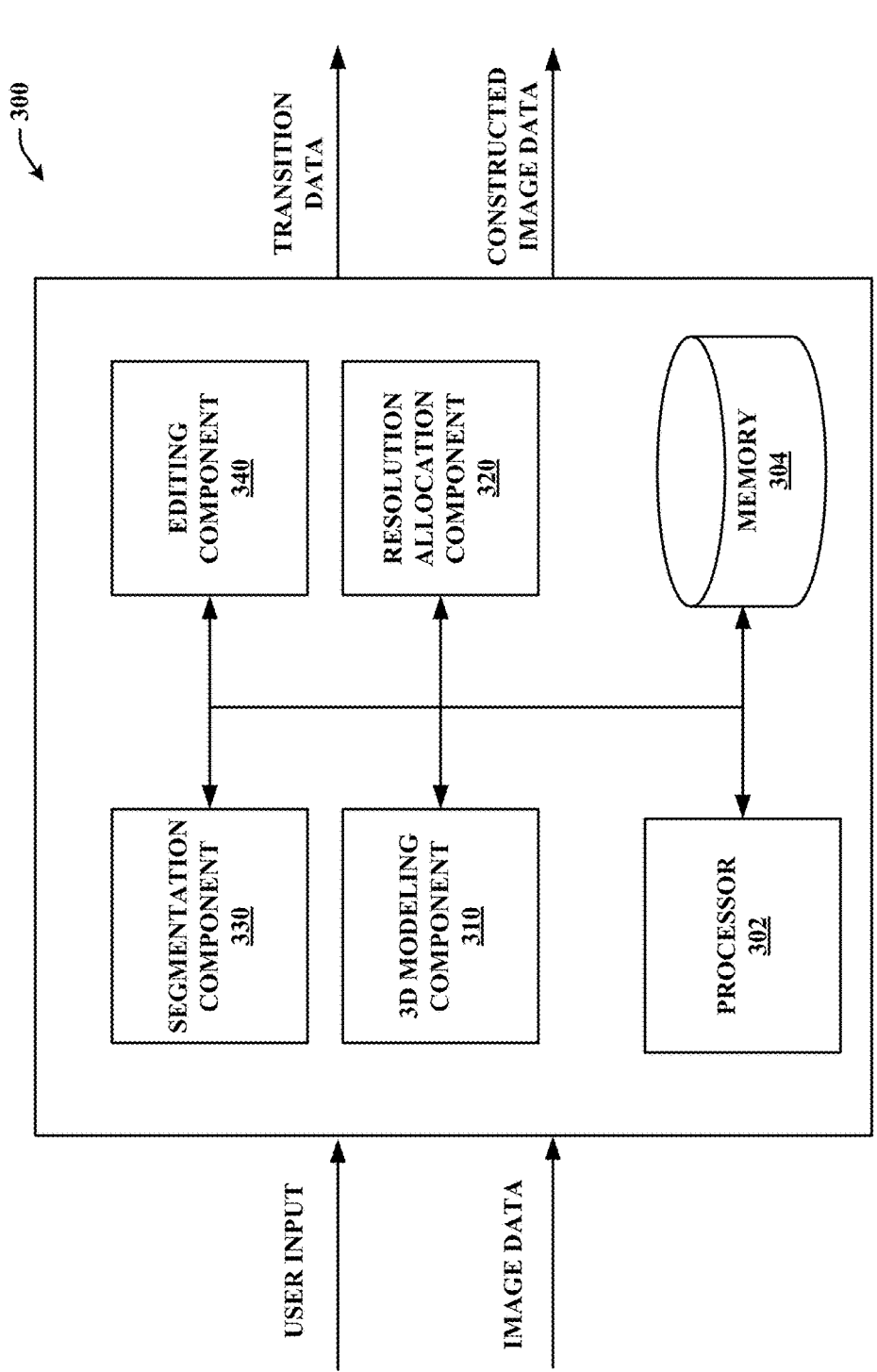
FIG. 3 illustrates a high-level block diagram of an example system that can facilitate generation of 3D models, segmentation of texture regions, allocation of resolutions to texture regions, and editing of 3D models or settings in accordance with certain embodiments of this disclosure.

Turning now to FIG. 3, a system 300 is depicted. System 300 can facilitate generation of 3D models, allocation of resolutions to texture regions, segmentation of texture regions, and editing of 3D models or settings, in accordance with various embodiments disclosed here. System 300 can include a memory 304 that stores computer executable components and a processor 302 that executes computer executable components stored in the memory 304.

As depicted, system 300 can include communicably coupled components primarily comprising 3D modeling component 310 (which can generate 3D models), resolution allocation component 320 (which can assign or alter resolutions to various texture regions), segmentation component 330 (which can facilitate segmentation of texture regions), and editing component 340 (which can facilitate user editing of a 3D model). It is noted that similarly named components of system 300 and other systems described herein can comprise similar aspects. It is to be appreciated that the system 300 can include various components described with reference to other systems described herein (e.g., system 100, system 200, etc.).

Various features or functionality of the components of system 300 are described herein with reference to one or more embodiments described below. Embodiments are described with reference to various exemplary scenarios, as such, it is appreciated that features or functionality of the components of system 300 can apply to other scenarios not mentioned for sake of brevity and readability.

Figure 4:
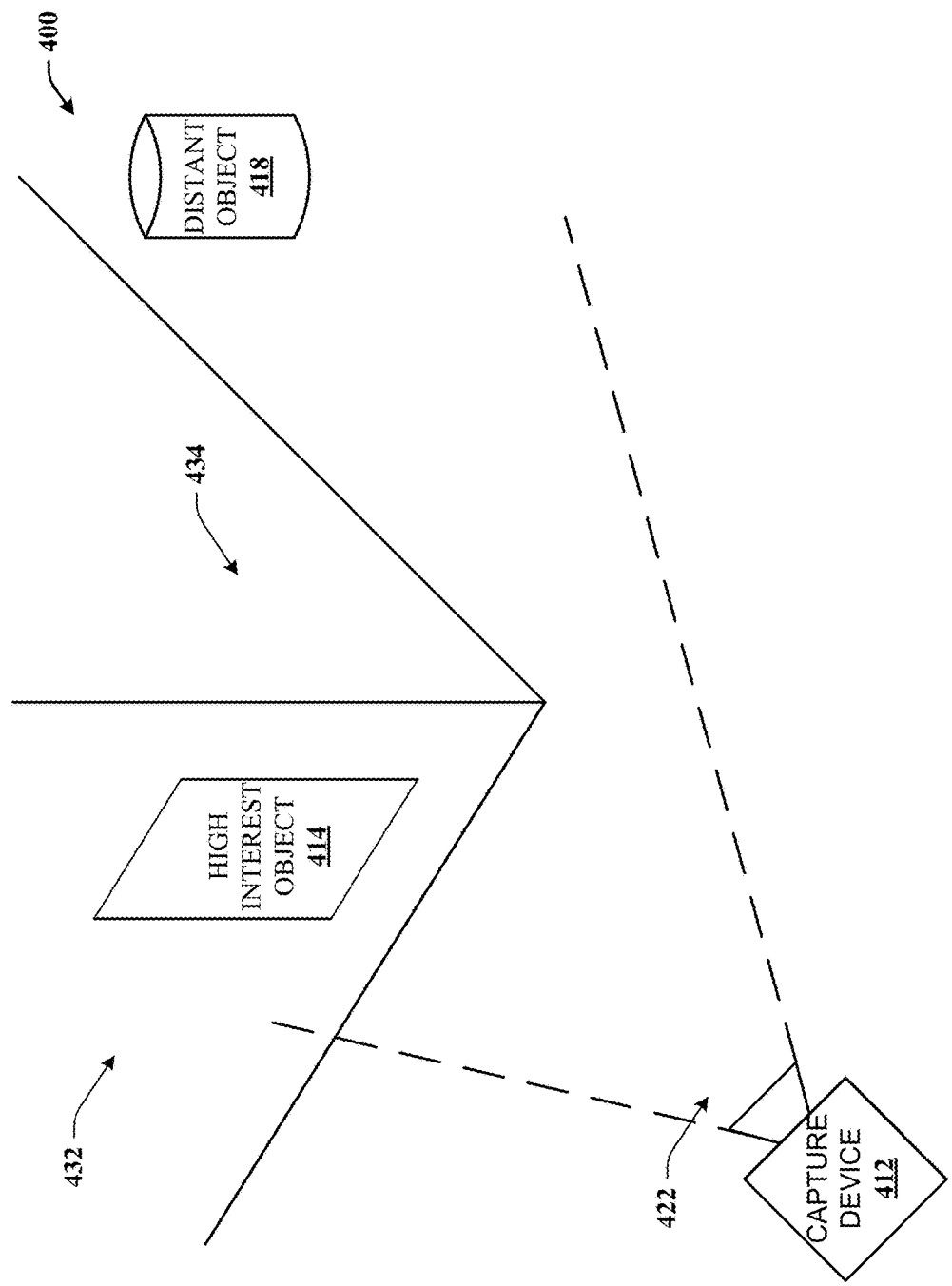
FIG. 4 illustrates a high-level block diagram of an example system that can facilitate capturing content in accordance with embodiments of this disclosure.

Turning to FIG. 4, with reference to FIG. 3, there illustrated is an exemplary capturing system 400 in an environment to be captured. System 400 can comprise one or more capturing devices, such as capturing device 412. While one capturing device (capturing device 412) is depicted, it is noted that other capturing devices can be utilized. In an aspect, capturing device 412 can communicate (e.g., wirelessly, or wired) via a network with system 300. In another aspect, capturing device 412 can be comprised within system 300.

In embodiments, capturing device 412 can be rotated or repositioned via a motor that rotates or repositions capturing device 412 such that field of capture 422 is rotated or repositioned. In some embodiments, the rotation or repositioning can be accomplished based on a user control, such as input received from input devices (e.g., joystick, buttons, remotes, mouse, etc.) or based on physical movement (e.g., user repositions or manually rotates).

In some embodiments, capturing device 412 can perform multiple captures or scans from a single capture position. Each scan can generate images captured at one or more resolutions. In an example, capturing device 412 can perform a high detail scan, a regular detail scan, and a low detail scan. While three distinct scans are described, it is appreciated that a different number of scans can be performed. In an aspect, textures generated from each scan can be stored in a texture database.

In operation, capturing device 412 can capture data corresponding to one or more views of surface 432 (e.g., a wall), surface 434 (e.g., a different wall), or objects within an environment, such as high interest object 414 and distant object 418. It is noted that high interest object 414 can represent an object within a frame (e.g., a photo, a poster, art work, and the like), text, people (e.g., living people, images of people, a face, etc.), or other object of high interest. Distant object 418 can represent any detectable object, such as furniture, living objects (e.g., plants, people, animals, etc.), or virtually any object. Distant object 418 can represent an object at a determined distance from a capturing point of capturing device 412.

In an embodiment, resolution allocation component 320 can determine that an area is allocated a larger amount of memory than needed. Based on this determining, resolution allocation component 320 can determine to alter a resolution to a lower resolution. The lower resolution can be determined based on a target resolution or based on selecting images having lower resolutions and replacing current images with the images having lower resolutions (e.g., such as images in a texture database). In another aspect, resolution allocation component 320 can remove all or some pixel data associated with a texture region or can indicate that the removed pixels should be generated (e.g., during rendering of a 3D model) based on an alternative method of representing color data (e.g., vertex coloring, painting, etc.). In an example, some areas or regions may not be particularly interesting to a user. Determining interest can comprise a subjective or objective analysis of regions. Subjective analysis can comprise an analysis based on user input or historical data indicative of past user input or actions. Objective analysis can comprise an analysis based on heuristics such as identification of architectural elements, analysis of various metrics that define aspects of an area, distance between a viewpoint or probable viewpoint and a region, or the like.

In an example, resolution allocation component 320 can detect areas of interest based on identification of objects within texture data, user input specifying an area or object of interest, or identification of objects during a capturing process. If resolution allocation component 320 determines an area or object is of high interest or importance, the corresponding texture can be stored at a higher resolution (e.g., relative to other textures) or a maximum available resolution.

In another example, some areas of texture can have low visual detail. For example, surface 432 can be a wall of a solid color (e.g., white, red, etc.). During a capturing or 3D model generating process, surface 432 can be associated with a large texture region with little visual detail or variations within the texture region. Resolution allocation component 320 can determine to condense the texture region (e.g., reduce a resolution of the texture) based on determining the texture region has little visual detail or variations. In an aspect, surface 432 can be rendered based on the reduce texture region such that the actual pixels of the rendering may not altered or may be altered with little to no affect on a users perception or satisfaction associated with the rendering.

In an aspect visual detail can be based on a spatial variation in texture, a power of high frequency components of a Fourier transform of the texture, or an average value of the high-frequency components of an image encoding of the texture. Resolution allocation component 320 can determine that high frequency channels of an image encoding (e.g., an image pyramid) of the texture are small (e.g., according to a threshold) and, in response, can remove the high frequency channels such that a resulting image has little or no perceptible visual change. It is noted that if values in high frequency channels of an image are relatively low, then removing small scale frequency channels has a small effect on the visual quality of an image and the resolution may be reduced to scale with a similarly small effect on visual quality of texture. The resolution allocated to texture of the image can be chosen based on the measured variation or a bound on a difference between low resolution and a high resolution version of the texture; for example, the lowest resolution version may be chosen that satisfies some metric of image difference between that resolution and the high resolution. In embodiments, resolution allocation component 320 can generate additional versions of the texture at additional resolutions. A difference can be calculated, for example, as an average absolute value of a pixel-wise difference between various versions of the texture and various other versions of the texture. A selected resolution can be the lowest resolution for which the value is below a particular threshold. In another example, a brightness difference of a given percentile of a distribution of absolute values of the difference can be utilized. It is noted that visual detail or variation can be determined based on other factors or techniques.

In another example, some regions of a model may be poorly scanned. A poorly scanned region can represent a region where available scan data is of a lower quality than in other parts of the model. Determining that a region is poorly scanned can comprise determining a quality of image data associated with the region meets a threshold quality, such as based on a predetermine quality threshold or a dynamically determined quality threshold based on a comparison of quality metrics associated with other regions. Poorly scanned regions can be identified as regions where a maximum resolution recoverable from any view of triangles in that region is significantly lower than in the rest of the model, such as due to distance or angle to the recorded views of that region. In an example, a poorly scanned region can be a result of the region being far from a capture location (e.g., capture positions associated with capturing device 412) from which data was captured, such as distant object

418. In another example, a poorly scanned region can correspond to a surface at an oblique angle to rays from a nearby scanning location (e.g., such as all or a portion of surface 434). In an aspect, an area of a surface (e.g., distant object 418 or a ceiling) which is only ever seem from far away may have limited resolution due to distance, and a patch of surface which is only seen at a very shallow angle (e.g., portion of surface 434) may only have limited resolution available as measured in pixels per square meter of surface area. In embodiments, resolution allocation component 320 can determine input data available is poor and can determine whether less memory or detail should be applied to the regions such that a rendering of the region can result in little or no degradation in visual quality. Determination of poor input data or useful target resolution for a region may be accomplished via various methods such as determining the effective capture resolution based on parameters such as camera resolution, distance, and angle, or analyzing image data at different spatial frequencies to determine a maximum level of detail. This resolution reduction may be achieved by reducing the resolution at which textures in the region are stored or selecting low resolution images from a low resolution scan.

In one or more examples, resolution allocation component 320 can determine some regions are far away from user viewpoints when navigating the rendered model (e.g., potential viewpoints, probable viewpoints, etc.) and do not need high detail or resolution. For example, if it is determined that an area is not likely to be viewed from up close by a user walking through a model (e.g., a ceiling), then a resolution of the area can be reduced or can be selected such that the area will not be altered to a higher resolution. In some embodiments, the area can have a low resolution to begin with (e.g., as a result of a capturing process). In this instance, texture associated with the area can be stored at the low resolution or a reduced resolution. In another embodiment, the area can have a high resolution to begin with (e.g., as a result of a capturing process) but may not be viewed closely. Thus, resolution allocation component 320 can reduce the resolution to a threshold resolution.

Resolution allocation component 320 can determine (e.g., predict) a probability that an area will be viewed closely based on a history associated with one or more users or based on predetermined criteria. A history can be analyzed to determine a statistical probability associated with region of a model. In various embodiments, resolution allocation component 320 can utilize artificial intelligence or statistical models to determine a likelihood of whether an area will be viewed closely. For example, resolution allocation component 320 can determine that a high ceiling is unlikely to be viewed up close by a user walking through the model. It is noted that a history can be monitored by one or more components of system 300.

In an aspect, a texture associated (e.g., mapped to or covered during rendering) with a region of mesh with unit area (in square meters) which is viewed from no closer than distance (D) will subtend at most $$S = \frac{1}{D^2}$$

steradians. If there are R pixels per unit area, where R is a number, in the texture once it is projected onto the mesh then the pixels per steradian are $$\frac{R}{S}.$$

If the desired lowest visual resolution is N pixels, where N is a number, per steradian then solving the equation $$N \leq \frac{R}{S}$$

gives $$R \geq N \times S = \frac{N}{D^2}$$

as a minimum required resolution. In embodiments, when it is determined that a likelihood that a texture area will be viewed at least distance D from the closest point of the mesh, for a given texture, meets a defined threshold likelihood, then the resolution of that texture area can be set to a minimum resolution (e.g., as described above), assuming the minimum is less than a default resolution associated with textures of a 3D model.

In another example, a 3D model can be associated with a set of textures that comprise many small triangular texture regions. Resolution allocation component 320 can determine if excess memory is utilized to store these small triangular regions of texture. In an aspect, the small triangular regions of texture may not be a part of a large smooth surface. These regions can be a result of sparsely scanned regions of a space that results in errors associated with depth data, gaps between triangles, or incomplete capture of areas. An example of a space that can result in the above small triangular texture regions include edges of outdoor spaces, where a resulting model transitions from a complete flat surface, to a surface with many holes, to a scattering of disconnected triangles. In one aspect, as a distance to a nearest scan location increases, the quality of the data used to generate the model decreases. Another example of such a space includes a space that, when captured, produces regions where poor reconstruction has resulted in a smooth surface being reconstructed as a set of small bumpy, disconnected, or overlapping patches.

In another example, textures may be subdivided into smaller regions, for example along the boundaries of one or more mesh triangles, with the level of detail calculated separately for each region. These regions can result in inefficient use of texture memory as each region requires padding when added to an atlas. In an aspect, segmentation component 330 can determine to re-segment the regions into more efficient regions. It is noted that segmentation component 330 can determine efficient segments during a 3D model generation process or post generation of a 3D model. While various embodiments describe altering resolutions of texture regions, it is appreciated that segmentation component 330 can facilitate, in coordination with resolution allocation component 320, segmenting texture into regions and assigning appropriate resolutions to the regions.

In an example, many small textures of this kind can be particularly expensive because of extra space needed due to imperfect texture packing, as well as the higher ratio of padding pixels to pixels that map to a triangle in a mesh of a 3D model. To reduce or alter the small textures, segmentation component 330 can selectively remove small triangles from the mesh to reduce geometry in the mesh. Removing the triangles can comprise re-segmenting areas associated with the triangles and the like. In some aspects, segmentation component 330 can determine whether removing a triangle alters a visual appearance of the mesh based on comparing the mesh to a mesh with removed triangles. In some embodiments, comparing can comprise an automatic comparison or comparison based on receiving user input indicating whether a visual appearance is altered or an automatic comparison (e.g., based on analysis of spatial variations, etc.).

In another embodiment, segmentation component 330 can determine that triangles should not be removed and resolution allocation component 320 can determine triangles should be colored based on alternative methods of representing color data that does not rely on a texture reference (e.g., such as an algorithmic coloring method). For example, segmentation component 330 can determine that removing triangles of a 3D mesh results in degradation of visual quality of a model (e.g., based on comparison of a 3D model and a 3D model with removed triangles) and in response or in parallel with this determining, resolution allocation component 320 can determine to remove or delete pixel data associated with triangular texture regions. In various other embodiments, resolution allocation component 320 can determine to remove or delete pixel data and/or utilize alternative methods of representing color data independent of segmentation component 330 determining that triangles should or should not be removed. In an example, resolution allocation component 320 can determine to utilize alternative methods of representing color data such as vertex coloring in place of utilizing pixels of a texture region. Face coloring can assign a color to a face associated with a mesh as a single color across the whole triangle. Vertex coloring can assign a color to a face associated with a mesh as a spatially weighted blend of colors based on colors at vertices of the triangle. In either case, vertex or face coloring can reduce texture memory associated with the triangles. It is noted that resolution allocation component 320 or segmentation component 330 can determine whether to remove or otherwise alter small texture regions based on various other factors, such as a level of importance or interest associated with the small texture regions. For example, regions that are designated as less important can allow for more projection error, more deletion of triangles, or more application of vertex or face coloring techniques. In another aspect, larger variations can be normal between triangles associated with the same texture, resulting in allowance of larger angles between some of these triangles for the texture for these regions.

As another example, some texture regions can correspond to a large region of mostly low detail and smaller regions of higher (fine) detail. For example, surface 432 can comprise a wall having mostly low detail and a region of high detail (e.g., high interest object 414). As another example, a low detail region can correspond to a mostly blank whiteboard with a small region of writing on the white board. Typically, the entire surface 432 or white-board would be projected onto a single texture, for which a single resolution would be chosen. To preserve the high detail area would then require using a high resolution texture for the entire surface. To be more efficient, regions of high detail within an otherwise low-detail texture can be identified by resolution allocation component 320. The triangles containing these high detail regions may then be assigned to a higher resolution texture, while the low detail regions are assigned a reduced resolution without regard for preserving the detail of the low detail region.

In an aspect, segmentation component 330 can re-segment the regions to separate the low detail regions and the high detail regions. The regions of a texture which have fine detail may be separated from regions which do not have fine detail by creating a map of detail level across the texture and applying a graph-cut algorithm to separate regions of low detail from high detail. Regions of high detail may be expanded to cover full triangles in the mesh that will be textured by the high detail texture rather than a low detail texture. If triangles in the mesh in the high-detail area are large relative to the size of the high-detail area then these triangles may be subdivided to reduce the area that will be covered by the high-detail texture. This subdivision may happen along the boundary or a limited number of line segments that enclose the boundary of the high detail texture region, and then further triangles may be added as necessary to triangulate the areas of the mesh around the boundary. It is noted that if the region of fine detail is below a threshold size or level of contrast, the algorithm may choose to keep the area at low resolution anyway. In one or more embodiments, if the high detail area includes a single change in brightness along two regions of otherwise uniform brightness, a mesh edge can be added along a brightness boundary, allowing the two regions to use two different low-resolution textures instead of introducing a high-resolution texture at the edge. Such regions may be detected, for example, by using an edge detection algorithm and/or a region growing algorithm looking for areas of a texture with near-uniform brightness.

In another example, some regions can comprise repeated patterns. Resolution allocation component 320 can identify any identifiable pattern within the regions. Examples of areas having identifiable patterns can comprise a tiled surface (e.g., floor, wall, ceiling, countertop, etc.), a Venetian blind, brick surfaces, ventilation aluminum, vinyl siding, wallpaper, carpeting, fabric, block windows, other areas having regular or semi-regular repeating patterns, and the like. 2D pattern detection techniques such as "Detecting, localizing, and grouping repeated scene elements from an image" by Thonas Leung and Jitendra Malik (Proceedings of the 4th European Conference on Computer Vision— Volume I, p. 546-555, Apr. 15-18, 1996) can be applied to the textures to determine whether a repeating pattern is present and the pattern can be identified. A separated texture can be generated based on identifying the pattern and then subtracting the pattern from an overall texture. Subtracting the pattern can result in generation of a patterned texture (e.g., sub-texture, portion, or channel of the overall texture, etc.) and a residual texture. The residual texture can be at substantially lower resolution. The patterned texture and the residual texture can be combined, for example multiplicatively, at rendering time by a shader on a graphics card. In another aspect, a resolution of the residual texture can be reduced or removed in accordance with various aspects disclosed herein. It is noted that the resolution of the residual texture can be reduced regardless of spatial variation or detail within the residual texture once the patterned texture is removed. If the residual texture is removed, the residual texture can be artificially generated (e.g., based on a pseudo-random shading technique, algorithmically generated pseudo-random texture, etc.) at run time (e.g., rendering time) and combined with the patterned texture. In some instances, the residual texture can correspond to lighting variations and reflections on reflective or partially reflective surfaces. In another aspect, resolution allocation component 320 can utilize alternative methods of representing color data, lighting, or shading techniques based on identified light sources to modify the patterned texture. In another aspect, resolution allocation component 320 can identify a pre-determined pattern based on a library of pre-determined patterns. A library can comprise a set of previously identified patterns or pre-defined patterns. For example, a 3D model can comprise a model of an architectural structure having multiple rooms. The rooms can have common patterns and once a common pattern is identified, the pattern can be reused. In some examples, multiple bathrooms can have the same tiled pattern, multiple walls can have a common wallpaper, windows can utilize a common window treatment (e.g., blinds, shades, etc.), and the like.

Once a repeating patterned texture is identified, it may then be represented in a highly compact fashion. The identified repeating patterned textured can then be utilized to represent various regions of a 3D model and/or stored in a library of patterns. For example, a repeating patterned texture can be designated as a "tiled" texture for rendering in a tiled fashion on the model.

In yet another example, some areas of texture can correspond to captured regions having random or semi-random textures. For example, a region of a mesh can correspond to a stuccoed wall, sponge paint ceiling, wood paneling, wood grain, and the like. Resolution allocation component 320 can identify the semi-random or random texture and can determine to replace the random or semi-random texture with an algorithmically generated random or pseudo-random texture that best matches the original texture. One technique for recognizing and generating such textures is described in "Learning generative texture models with extended Fields-of-Experts" by Heess, Williams, and Hinton. It is noted that random or semi-random textures can be separated into visual components, and a result can generate a generative texture model and a residual texture that can represent variations in illumination and the like.

Once a random or semi-random texture is identified, it may then be represented in a highly compact fashion. It may be stored or transmitted as a generative algorithm and then turned into a texture on a client machine prior to rendering. Alternatively, it may be generated at render time using a shader algorithm or other technique.

In one or more embodiments, a user can provide input (e.g., via an interface) to editing component 340. The user input can correspond to a user's desire to alter a resolution of a 3D model or a portion of the 3D model. For example, a user can view a rendering of a 3D model and can determine whether an area or object within the model should have an altered resolution (e.g., increased resolution, decreased resolution, etc.). In another example, a user can provide input prior to rendering that indicates the model should be rendered utilizing or not utilizing resolution allocation techniques as described herein. It is noted that a user can selectively determine to utilize certain resolution allocation techniques (e.g., pattern identification, high interest regions, etc.). In one or more other embodiments, editing component 340 can determine performance metrics associated with rendering a 3D model and can determine whether resolution allocation will result in an increase or decrease of a user's experience. For example, editing component 340 can determine performance metrics associated with one or more components of a user equipment device (e.g., desktop computer, smart phone, set top box, tablet, PDA, etc.). The performance metrics can be determined based on specifications of processors, graphics cards, monitors, viewing components, connection speed (e.g., available bandwidth, download/upload speed, etc.), and the like. In another aspect, editing component 340 can facilitate a test of a user equipment device to determine whether resolution allocation at a particular level will likely result in a substantially increased or decreased user experience. In one example, editing component 340 can determine a maximum resolution of a monitor associated with a user equipment device. Based on the maximum resolution, editing component 340 can determine a maximum resolution at which texture data can be stored.

Figure 5:
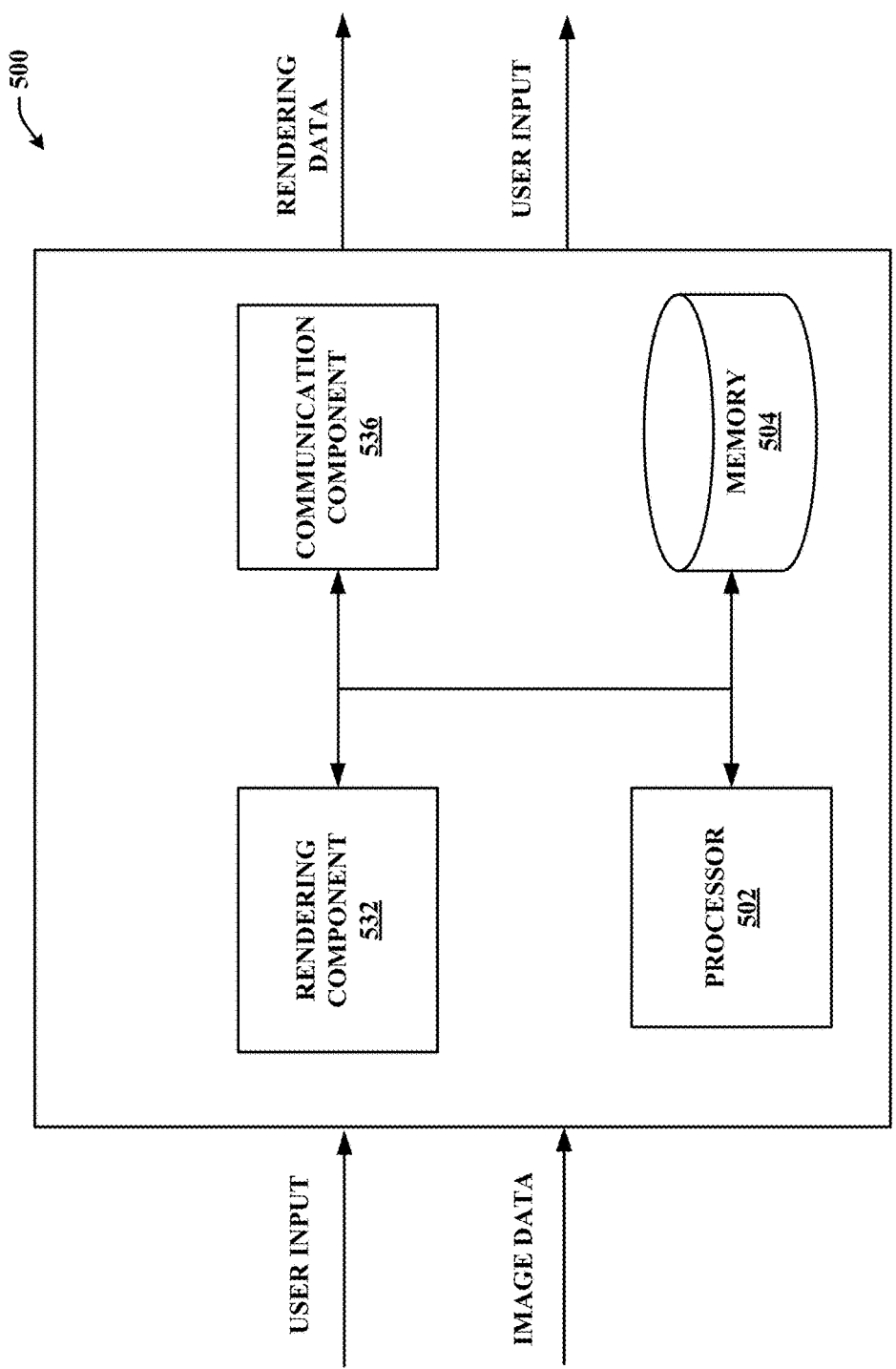
FIG. 5 illustrates a high-level block diagram of an example system that can facilitate rendering 3D models with regions of texturing having various resolutions in accordance with certain embodiments of this disclosure.

Turning now to FIG. 5, a system 500 is depicted. System 500 can render 3D models with regions of texturing having various resolutions, in accordance with various embodiments disclosed here. System 500 can include a memory 504 that stores computer executable components and a processor 502 that executes computer executable components stored in the memory 504.

As depicted, system 500 can include communicably coupled components primarily comprising 3D rendering component 532 (which can render 3D models having various portions in various resolutions) and communication component 536 (which can receive imagery data associated with 3D models and can send/receive user input). It is to be appreciated that the system 500 can include various components and/or communicated with various components described with reference to other systems described herein (e.g., system 100, system 200, etc.).

Communication component 536 can facilitate communication with one or more components, devices, or systems. In an aspect, communication component 536 can facilitate downloading, streaming, or otherwise receiving a 3D model and related data. In some embodiments, communication component 536 can receive a 3D model from a local or remote storage, such as a server. In another aspect, communication component 536 can comprise user interface devices (e.g., a mouse, a touch screen, etc.) that can facilitate receiving of user input.

Rendering component 532 can render a 3D model based on received or stored data. It is noted that rendering component 532 can comprise various interfaces (e.g., monitors, screens, etc.), processors (e.g., GPUs), graphics cards, and the like. In an aspect, rendering component 532 can render various portions of a model based on generating a rendering of a mesh and mapping texture to appropriate portions of the mesh. For example, rendering component 532 can construct a 3D model based on a 3D mesh and can select texture regions having various resolutions, as described herein, for mapping or layering on the 3D mesh.

In some embodiments, rendering component 532 can identify whether texture associated with a geometric portion of a 3D model should be generated based on an algorithm or alternate texturing method, such as by identifying an indicator or flag that designates texture as being associated with an alternate texturing method. In response to identifying that the texture should be generated based on an alternate method, rendering component 532 can select an appropriate alternate texture rendering technique. For example, rendering component 532 can identify that a portion of texture has a high resolution texture and a residual texture. If the residual texture does not comprise data or otherwise indicates that an artificial or alternative texture rendering technique should be utilized, an appropriate technique can be chosen and utilized for rendering the area.

In an aspect, a region of texture can comprise data identifying that the region is associated with an alternative method of representing texture data based on a determined pattern. In one aspect, rendering component 532 can utilize a library of patterns that are associated with the region of texture (e.g., wood grain, tile, venetian blinds, etc.).

FIGS. 6-11 illustrate various methodologies in accordance with certain embodiments of this disclosure. While, for purposes of simplicity of explanation, the methodologies are shown as a series of acts within the context of various flowcharts, it is to be understood and appreciated that embodiments of the disclosure are not limited by the order of acts, as some acts may occur in different orders or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media. It is noted that the methods depicted in FIGS. 6-11 can be performed by various systems disclosed herein, such as systems 100, 200, 300, 400, and 500.

Figure 6:
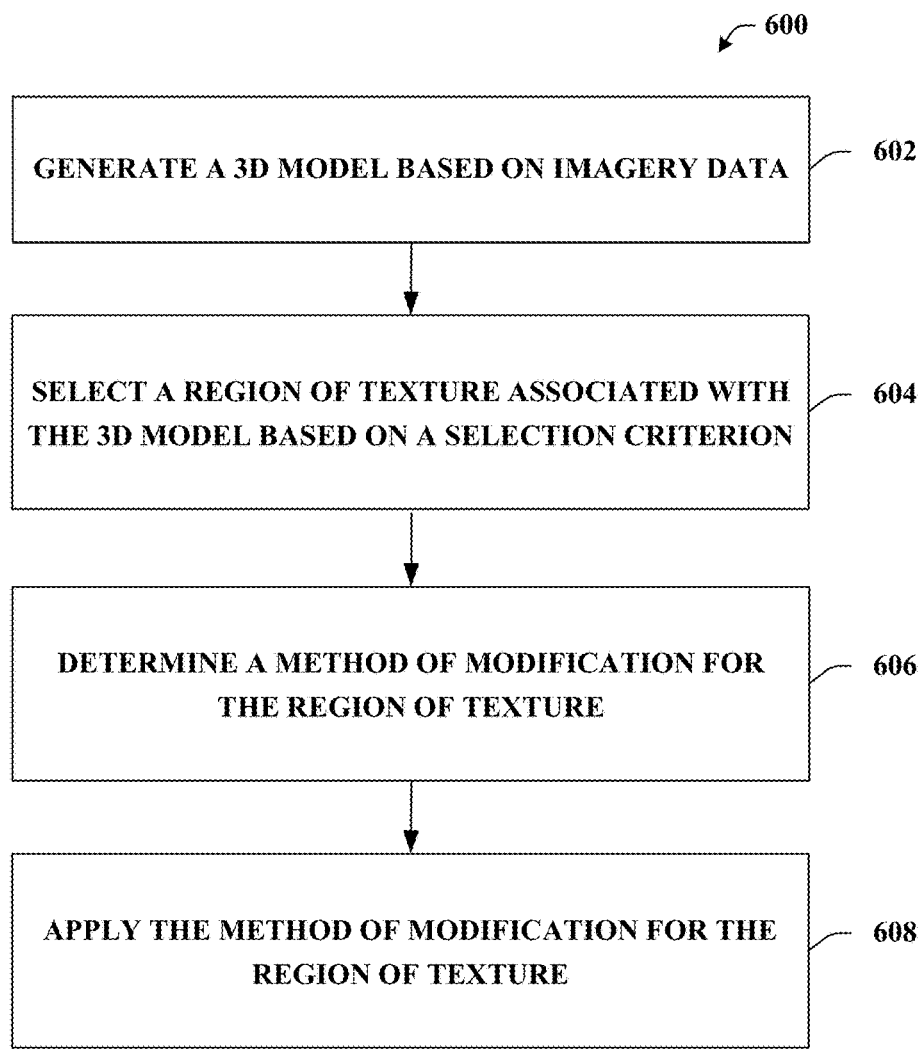
FIG. 6 illustrates an example methodology that can provide for allocating resolutions for regions of texture of a 3D model in accordance with certain embodiments of this disclosure.

FIG. 6 illustrates exemplary method 600. Method 600 can provide for allocating resolutions for regions of texture of a 3D model. In another aspect, the method 600 can generate 3D models having regions of texture at various resolutions. For example, a system can generate a 3D model and can assign resolutions or alternative methods of representing texture data to various regions of texture.

At 602, a system can generate (e.g., via 3D modeling component 110) a 3D model based on imagery data. In an aspect, 3D imagery data (e.g., 2D image data, 3D image data, sensory data, etc.) can be captured, received from a memory, or generated based on a 3D modeling process. A 3D mesh and a texture atlas(es) can be generated as parts of a 3D model. In an aspect, regions of the texture of an atlas can be mapped (e.g., corresponded) to regions of a 3D mesh. Each region of a texture can comprise a set of pixels at one or more resolutions.

At 604, a system can select (e.g., via resolution allocation component 120) a region of texture associated with the 3D model based on a selection criterion in accordance with various embodiments disclosed herein. For example, a system can select regions of texture based on identified architectural structures, objects, text, distance from a capturing point, distance from a predicted viewpoint, and the like. In another example, regions of texture can be selected based on quality metrics of the regions or portions of the regions (e.g., identification of variance of visual detail), identifiable patterns (e.g., repeating patterns, semi-random patterns, random patterns, etc.) identified levels of interest associated with regions, etc.

At 606, a system can determine (e.g., via resolution allocation component 120) a method of modification for the region of texture. According to one or more embodiments disclosed herein, a system can determine whether to alter (e.g., increase or decrease) texture resolutions for regions or portions of regions, whether to utilize alternative methods of representing texture data (e.g., with vertex or face shading), and/or whether to utilize an algorithmically generated pattern. In another aspect, the system can determine not to modify the region of texture.

In an aspect, if the system determines to alter a texture resolution, then a target resolution for altering the region of texture can be selected. A target resolution can be determined based on comparing an image of the texture at a first or initial resolution to an image of the texture at a second or disparate candidate resolution. The comparison can continue until comparison of the texture at the initial resolution and a candidate resolution meets a defined threshold. For example, candidate resolutions can be altered (decreased or increased) until a difference of visual quality meets a defined stopping point. Once the defined stopping point is reached, the candidate resolution can be chosen. In another example, a pre-determined minimum resolution can be chosen for the region of texture. In one aspect, a pre-determined minimum resolution can be chosen from a set of pre-determined minimum resolutions. Each minimum resolution of the set of pre-determined minimum resolutions can be associated with various architectural elements, objects, levels of interest, and the like. For example, a ceiling can be associated with a first pre-determined minimum resolution and a distant object can be associated with a second pre-determined minimum resolution. It is noted that in some embodiments a target resolution can be determined based on user input that identifies a target resolution.

In one or more other embodiments, a target resolution can be a maximum or higher resolution relative to other regions. For example, the system can determine to utilize a maximum available resolution for a region associated with a high level of interest or a region associated with fine visual detail. In some embodiments, the system can instruct a capturing device to recapture the texture region at a maximum possible resolution. In another embodiment, the system can generate a notification to a user that instructs the user to capture the texture region at a maximum possible resolution. Once an image, corresponding to the region of texture, at the highest possible resolution is received, the system can apply texture data from the image.

In another aspect, the system can determine to utilize an alternative appearance representation technique to apply to the region of texture, such as in response to identifying a pattern (e.g., a spatially repetitive pattern, a semi-random pattern, etc.) or a spatial or appearance characteristic of the data. For example, if a region of texture is small (e.g., meets a defined size) or has very little color variation, the system can determine to utilize an more compact texturing or coloring technique, such as vertex coloring. In another example, the system can determine to utilize an artificial (e.g., a tiled or generative) texturing or coloring technique for a component (e.g., high detail channel) of a texture region. For example, a system can separate a region of texture into a high detail channel and a low detail channel. A low detail channel can utilize a determined resolution while the high detail channel can utilize an alternative appearance representation technique (e.g., a tiled or generative texture).

At 608, a system can apply (e.g., via resolution allocation component 320) the method of modification for the region of texture. In various embodiments, the system can modify a current resolution of the region of texture to a target resolution or remove texture data and replace with an alternative texture generating method. Altering the current resolution (or initial resolution) can comprise reducing the current resolution to the target resolution, increasing the current resolution to a maximum resolution, locking the current resolution at a target resolution (which may the current resolution), and the like.

In an aspect, removing texture data associated with the region of texture can comprise deleting some or all of the texture data. Deleting texture data can facilitate a more efficient allocation of memory in the texture atlas, allowing the total textures for the model to be stored more compactly. It is noted that deletion of some texture data can include rearranging the remaining textures within the atlas. The region of texture can be marked or flagged as a region associated with a determined alternative texturing or coloring technique. A texture region marked, flagged, or otherwise identified as associated with an alternative texturing or coloring technique can be stored for later use (e.g., rendering by rendering component 532). It is noted that a marker or flag can indicate an alternative texturing or coloring technique to be utilized (e.g., by rendering component 532) at a rendering time.

Figure 7:
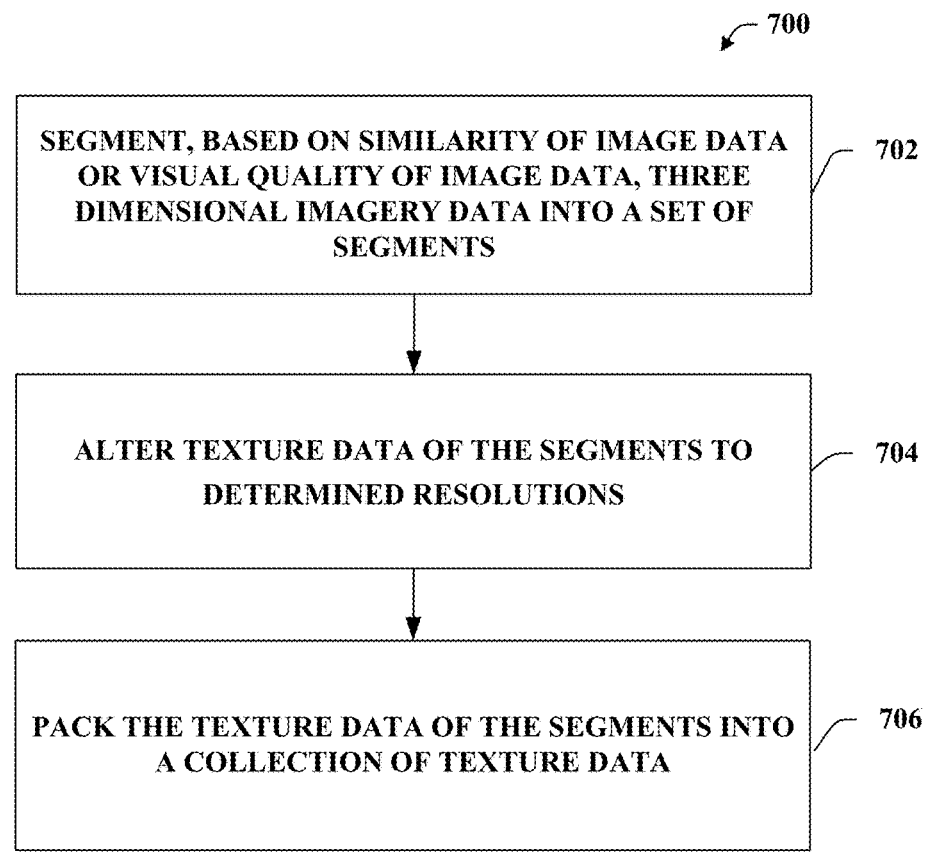
FIG. 7 illustrates an example methodology that can provide for judiciously segmenting texture data, altering the texture data, and packing the texture data into a set of 2D images in accordance with certain embodiments of this disclosure.

Turning now to FIG. 7, exemplary method 700 is depicted. Method 700 can provide for judiciously segmenting texture data, altering the texture data, and packing the texture data into a set of 2D images. For example, a system can receive a 3D model or 3D imagery data and segment it into a 3D mesh and texture areas. The texture areas can be altered to determined resolutions and can be efficiently packed into an atlas.

At 702, a system can segment (e.g., via segmentation component 330), based on similarity of image data, visual quality of image data, or other characteristics, three dimensional imagery data into a set of segments (e.g., regions). In an aspect, the system can determine segment sizes and positions based on identified similarity of image data or visual quality of image data, or other characteristics. Similarity of image data can be based on positions of segments of image detail and variance within the segments. In one aspect, the system can identify segments based on a level of visual detail. The level of visual detail can be a high detail level, low detail level, average detail level, or other naming conventions, such as a numeric score.

In one example, at 702, a system can re-segment 3D imagery data associated with a generated 3D model. In another example, at 702, a system can perform an initial segmentation process. As such, segmenting can occur after, before, or during generation of a 3D model.

At 704, a system can alter (e.g., via resolution allocation component 320) texture data of the segments to determined resolutions. Each segment can be assigned a determined resolution and the segments can be altered to the determined resolutions. It is noted that a determined resolution can be zero where a segment is selected for alternate texturing or coloring methods. In one aspect, altering texture data and segmenting 3D imagery data can occur simultaneously such that segments are determined concurrently with, or as a function of, determining resolutions for segments. Some embodiments can utilize artificial intelligence or statistical models to achieve best possible efficiency in segmentation and texture memory allocation while maintaining an acceptable level of visual quality. It is noted that an acceptable level of visual quality can be determined based on user input, a level associated with purchasing information (e.g., a user can purchase a high detail 3D model, a low detail 3D model, etc.), a level determined based on specifications of user equipment device, a pre-determined level of quality, and the like.

At 706, a system can pack (e.g., via resolution allocation component 320) the texture data of the segments into a collection of textures. The collection of textures can be comprised in a set of 2D images such as one or more atlases as described herein. In some embodiments, the system can generate padding between texture segments when the texture segments are packed into an atlas. In accordance with various embodiments of this disclosure, segmentation and resolution allocation can be based in part on a packing technique. For example, if a region of texture is associated with low interest, the texture can be assigned a low resolution or segmented to allow for a less detail-preserving packing.

Figure 8:
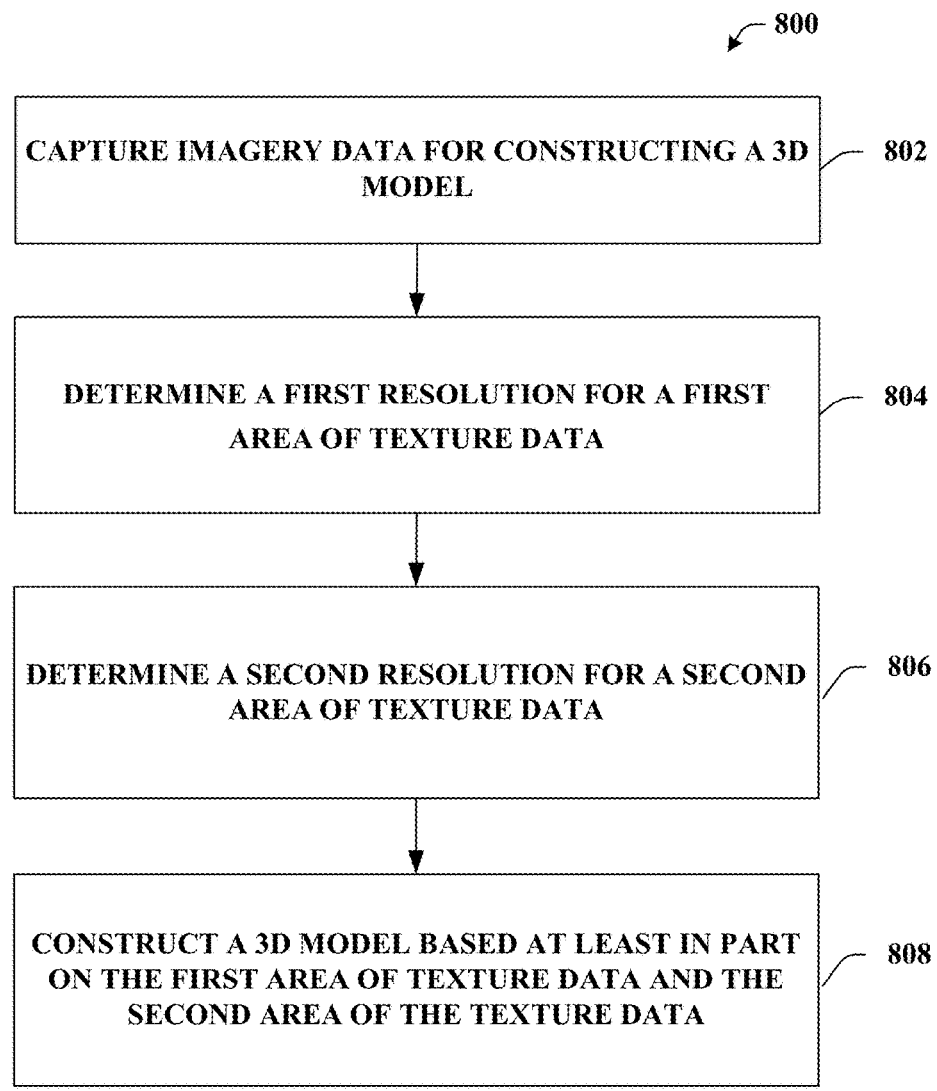
FIG. 8 illustrates an example methodology that can provide for capturing 3D imagery data, determining resolutions for areas of texture, and constructing a 3D model in accordance with certain embodiments of this disclosure.

Turning now to FIG. 8, exemplary method 800 is depicted. Method 800 can provide for capturing 3D imagery data, determining resolutions for areas of texture, and constructing a 3D model based at least in part on the determined resolutions. For example, a system can capture 2D imagery data and 3D imagery data for generating a 3D model. The system can determine resolutions for various texture areas (e.g., segments, regions, etc.) and can alter the various texture areas to the respective determined resolutions. The system can construct the 3D model having areas of various resolutions.

At 802, a system can capture (e.g., via capture component 230) imagery data for constructing a 3D model. In an aspect, the system can utilize various capturing devices (e.g., 2D capturing devices, 3D capturing devices, sensors, etc.) to capture or scan a real world space. The captured imagery data can be stored in a memory or processed by the system. While capturing imagery data is described at reference numeral 802, it is noted that imagery data can be received from a data store (e.g., imagery database 206).

At 804, a system can determine (e.g., via resolution allocation component 220) a first resolution for a first area of texture data, and at reference numeral 806, the system can determine (e.g., via resolution allocation component 220) a second resolution for a second area of texture data. In an example, the system can determine that a region comprises the first area having low visual detail and the second area having high or fine visual detail. The first resolution can be determined and applied to the first area such that a resolution of the first area is reduced. This reduction can result in little or no perceptible loss in visual quality. In another aspect, the reduction can reduce an amount of memory needed to store texture data of the first area. The second resolution (e.g., a maximum available resolution or some threshold resolution) can be determined and applied to the second area such that visual detail is not lost or is increased. In some embodiments, the second resolution can be a maximum available resolution or a resolution chosen such that visual quality is not lost. It is noted that resolutions of the first area and second area can each be altered to a common resolution or different resolutions. Likewise, the resolutions can be altered by various amounts and/or according to various scales.

At 808, a system can construct (e.g., via 3D modeling component 210) a 3d model based at least in part on the first area of texture data and the second area of the texture data. In an aspect, a system can assign or map the first area and second area to areas of a 3D mesh. In an example, the system can determine 3D triangles of a 3D mesh and associate triangular areas of texture to 3D triangles. In another aspect, the system can publish the 3D model such that the model can be downloaded, broadcasted, streamed, or otherwise disseminated over a communications network.

Figure 9:
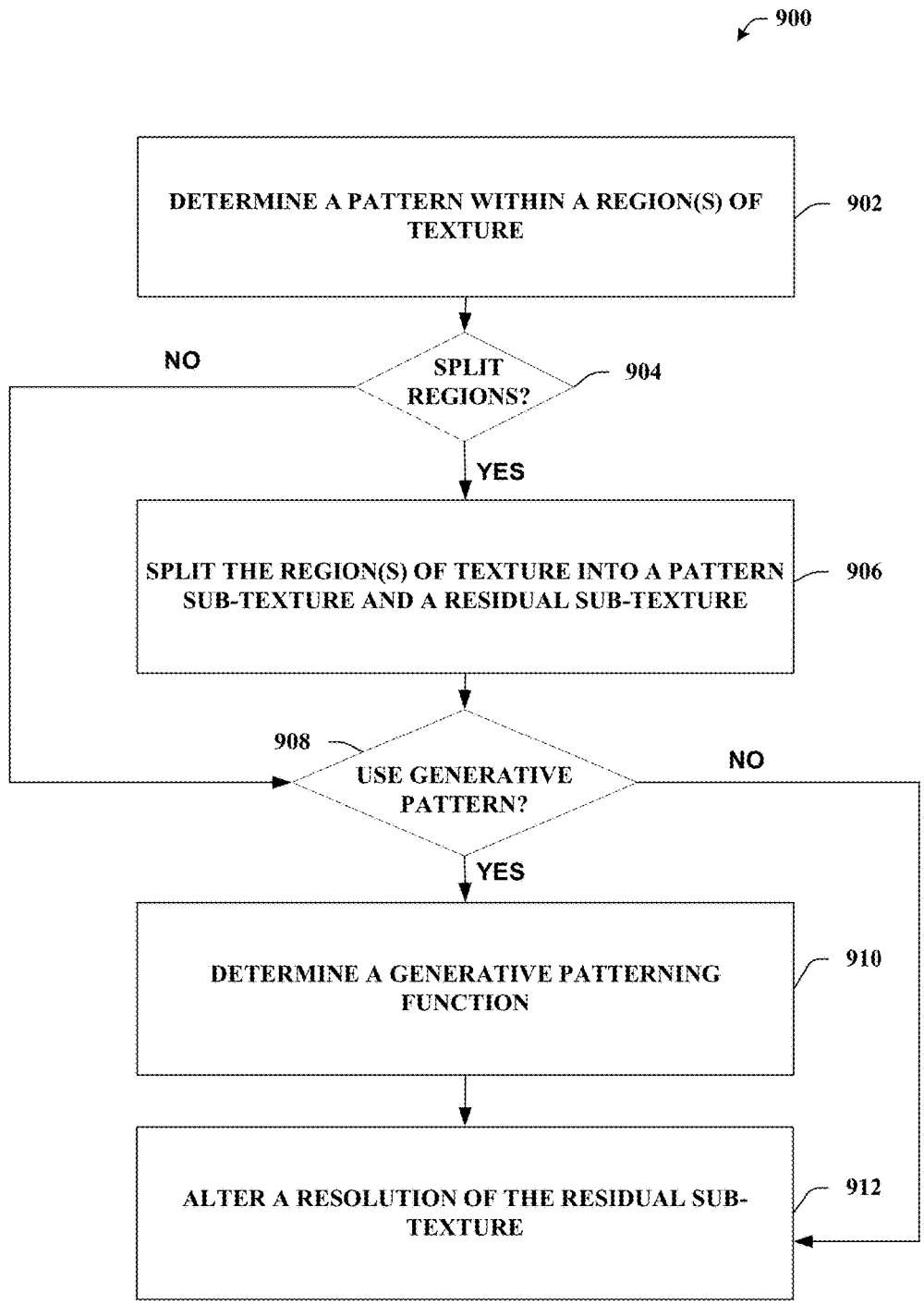
FIG. 9 illustrates an example methodology that can provide for identifying patterns within texture and allocating texture memory to texture regions associated with the patterns in accordance with certain embodiments of this disclosure.

Turning now to FIG. 9, exemplary method 900 is depicted. Method 900 can provide for identifying patterns within a texture and allocating texture memory to texture regions (e.g., areas, portions, segments, etc.) associated with the patterns. For example, a system can identify a regular repeating pattern, a semi-random pattern, or random pattern within texture data. The texture data can be split into sub-textures comprising a pattern sub-texture and a residual sub-texture.

At 902, a system can determine (e.g., via resolution allocation component 320) a pattern within a region(s) of texture. The pattern can be identified as a regular repeating pattern, a semi-random pattern, a random pattern, and the like. In some embodiments, the pattern can correspond to an area of a 3D model that is scanned from an area comprising tiling, wood grain, brick, a stuccoed surface, and the like. In an aspect, the system can determine a pattern based on various pattern identification techniques. Once identified, at reference numeral 904 a system can determine whether to split a texture into sub-textures. If the system determines to split the texture, method 900 can continue at reference numeral 906. If it is determined that the texture should not be split, then method 900 can continue at reference numeral 908.

At 906, a system can split (e.g., via resolution allocation component 320) the region(s) of texture into a geometric pattern sub-texture and a residual sub-texture. The pattern sub-texture and the residual sub-texture can be generated by identifying the pattern and then subtracting the pattern sub-texture from an overall texture. A result of the subtraction can generate the residual sub-texture. In some embodiments, the residual sub-texture can be at substantially lower resolution or can comprise lower visual detail.

At 908, the system can determine whether or not to generate a generative pattern function based on a detected pattern. If the system determines to utilize a generative pattern then method 900 can continue at 910, otherwise method 900 can continue at 912.

At 910, a system can determine (e.g., via resolution allocation component 320) a pattern generation function. The pattern generation function can comprise a function that, when applied by a rendering component (e.g., rendering component 532) generates the identified pattern or a similar pattern. In an example, the exact semi-random pattern, such as a stuccoed wall, may have little importance. A user might ignore or otherwise disregard the exact pattern, and a generative pattern can be generated with little or no loss in visual quality or user satisfaction. In some embodiments, the pattern generation function can facilitate generation of a pattern (e.g., at rendering) and a residual texture can be added to the generated pattern to generate an image. In other embodiments, the pattern generation function can automatically generate variations to represent a residual pattern.

At 912, a system can alter (e.g., via resolution allocation component 320) a resolution of the residual sub-texture if the residual sub-texture exists. In an example, a resolution of the residual sub-texture can be reduced according to various embodiments described in this disclosure. The resolution of the residual sub-texture can be altered (e.g., reduced) regardless of detail in the main pattern, spatial variation, or level of visual detail associated with the residual sub-texture. In some embodiments, the residual sub-texture or pixels of the residual sub-texture can be completely removed. If the residual sub-texture is removed, it can optionally be generated (e.g., based on a pseudo-random shading technique, algorithmically generated pseudo-random texture, etc.) at run time and combined with the patterned sub-texture.

Figure 10:
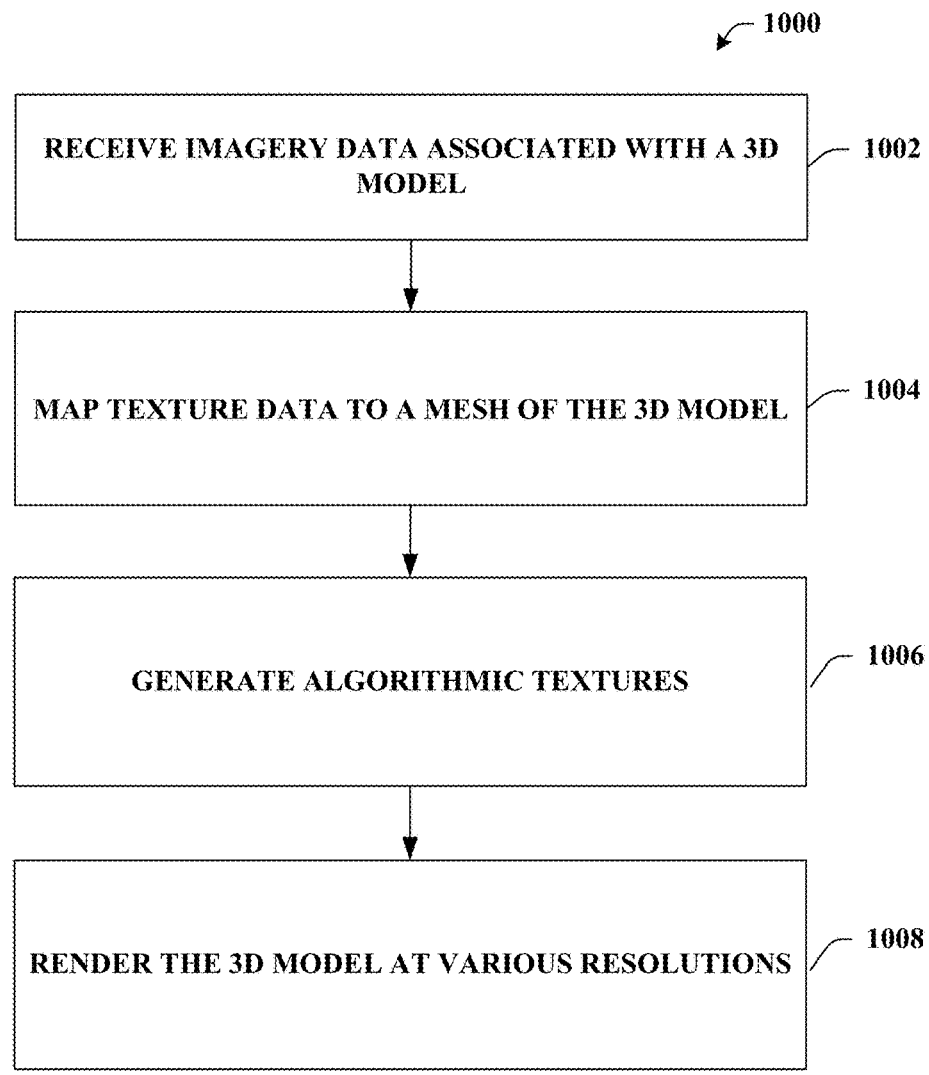
FIG. 10 illustrates an example methodology that can provide for rendering a 3D model having regions at various resolutions and various regions of associated with alternative methods of representing color data in accordance with certain embodiments of this disclosure.

FIG. 10 illustrates exemplary method 1000. Method 1000 can provide for rendering a 3D model having regions at various resolutions in accordance with various embodiments disclosed herein. For example, a system can receive data describing a 3D model and can generate a rendering of the 3D model (or a portion thereof) for display on an interface, such that various portions of the 3D model are generated at various resolutions or with various levels of detail.

At 1002, a system can receive (e.g., via communication component 536) imagery data associated with a 3D model. Imagery data can comprise 3D meshes, point clouds, metadata, texture atlases, and the like. In embodiments, imagery data can be received, at least in part, from one or more systems (e.g., system 100, system 200, system 300, etc.) described herein or from one or more data stores, such as a server or internal storage of a system.

At 1004, a system can map (e.g., via rendering component 532) texture data to a mesh of the 3D model. In embodiments, regions of texture data can be comprised in one or more atlases or sets of 2D images comprising texture data as well as possibly other appearance data. The texture regions can comprise regions having various resolutions or regions associated with alternative or generative texturing techniques. In some embodiments, the system can determine that portions of texture regions should be combined when mapped or rendered. For example, a pattern texture and a residual texture can be combined when rendered.

At 1006, a system can generate (e.g., via rendering component 532) artificial textures based on the received imagery data. For example, the imagery data can indicate that a particular texture region or 3D mesh region corresponds to a particular texture or color generating function. In an aspect, the texture function can comprise a pattern generation function (e.g., regular repeating pattern, semi-random pattern, random pattern, etc.), a shading or coloring function (e.g., artificial lighting function, vertex coloring function, etc.), and the like.

At 1008, a system can render (e.g., via rendering component 532) the 3D model at various resolutions. In an aspect, the system can render portions of the 3D model based on a user's position in a model and/or facilitate user navigation of the model. Some embodiments of the foregoing can be found in application Ser. No. 14/219,906.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 11:
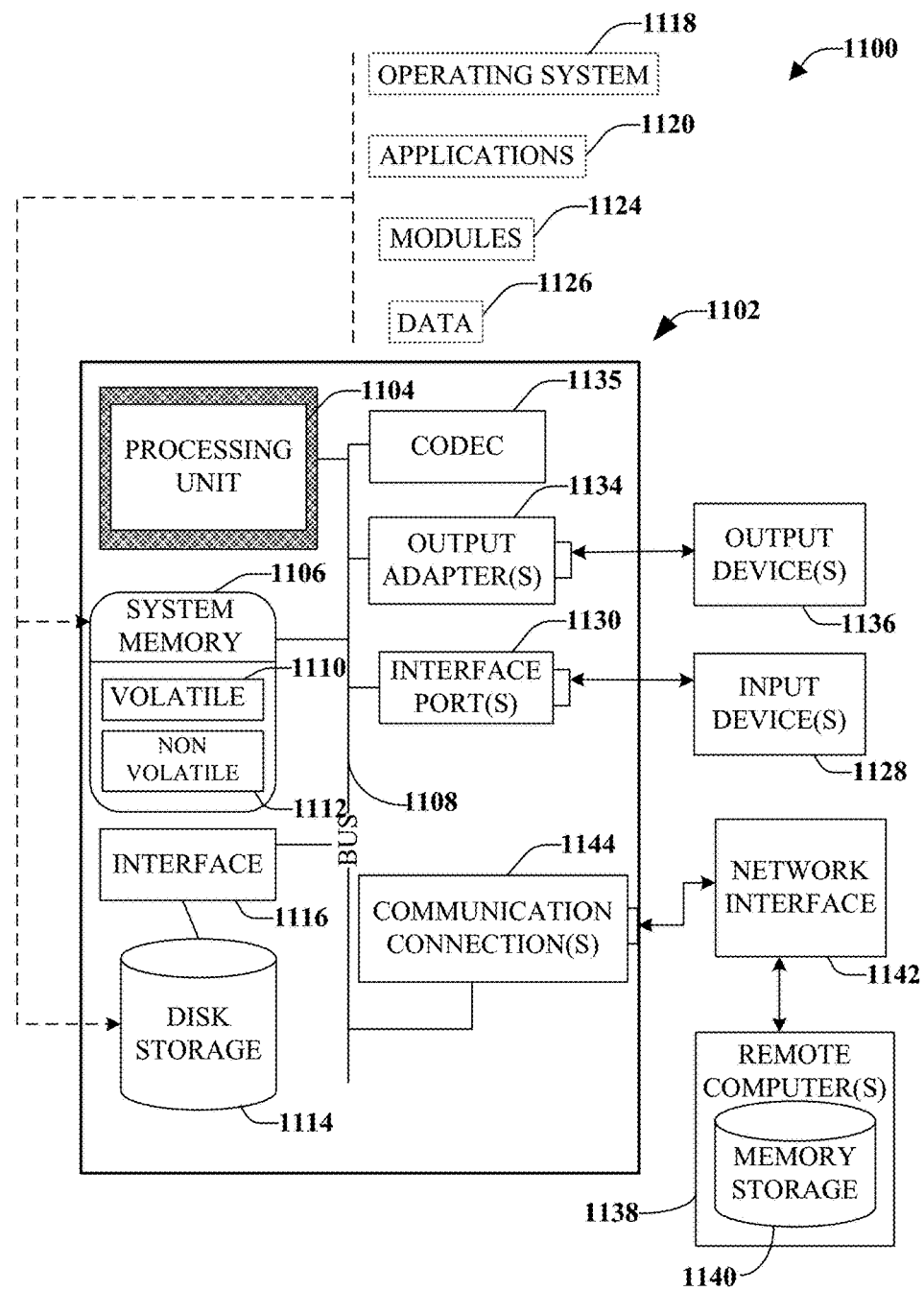
FIG. 11 illustrates an example schematic block diagram for a computing environment in accordance with certain embodiments of this disclosure.

With reference to FIG. 11, a suitable environment 1100 for implementing various aspects of the claimed subject matter includes a computer 1102. The computer 1102 includes a processing unit 1104, a system memory 1106, a codec 1135, and a system bus 1108. The system bus 1108 couples system components including, but not limited to, the system memory 1106 to the processing unit 1104. The processing unit 1104 can be any of various available processors. Dual microprocessors and other multiprocessor architectures also can be employed as the processing unit 1104.

The system bus 1108 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1106 includes volatile memory 1110 and non-volatile memory 1112. The basic input/output system (BIOS), containing the basic routines to transfer information between elements within the computer 1102, such as during start-up, is stored in non-volatile memory 1112. In addition, according to present innovations, codec 1135 may include at least one of an encoder or decoder, wherein the at least one of an encoder or decoder may consist of hardware, software, or a combination of hardware and software. Although, codec 1135 is depicted as a separate component, codec 1135 may be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), or flash memory. Volatile memory 1110 includes random access memory (RAM), which acts as external cache memory. According to present aspects, the volatile memory may store the write operation retry logic (not shown in FIG. 11) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1102 may also include removable/non-removable, volatile/non-volatile computer storage medium. FIG. 11 illustrates, for example, disk storage 1114. Disk storage 1114 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1114 can include a storage medium separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1114 to the system bus 1108, a removable or non-removable interface is typically used, such as interface 1116. It is appreciated that storage devices 1114 can store information related to a user. Such information might be stored at or provided to a server or to an application running on a user device. In one embodiment, the user can be notified (e.g., by way of output device(s) 1136) of the types of information that are stored to disk storage 1114 or transmitted to the server or application. The user can be provided the opportunity to control use of such information collected or shared with the server or application (e.g., by way of input from input device(s) 1128).

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer 1102. Applications 1120 take advantage of the management of resources by operating system 1118 through program modules 1124, and program data 1126, such as the boot/shutdown transaction table and the like, stored either in system memory 1106 or on disk storage 1114. It is to be appreciated that the claimed subject matter can be implemented with various operating systems or combinations of operating systems.

A user enters commands or information into the computer 1102 through input device(s) 1128. Input devices 1128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s) 1128. Thus, for example, a USB port may be used to provide input to computer 1102 and to output information from computer 1102 to an output device 1136. Output adapter 1134 is provided to illustrate that there are some output devices 1136 like monitors, speakers, and printers, among other output devices 1136, which require special adapters. The output adapters 1134 include, by way of illustration and not limitation, video and sound cards that provide a means of connection between the output device 1136 and the system bus 1108. It should be noted that other devices or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1144 refers to the hardware/software employed to connect the network interface 1142 to the bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

Figure 12:
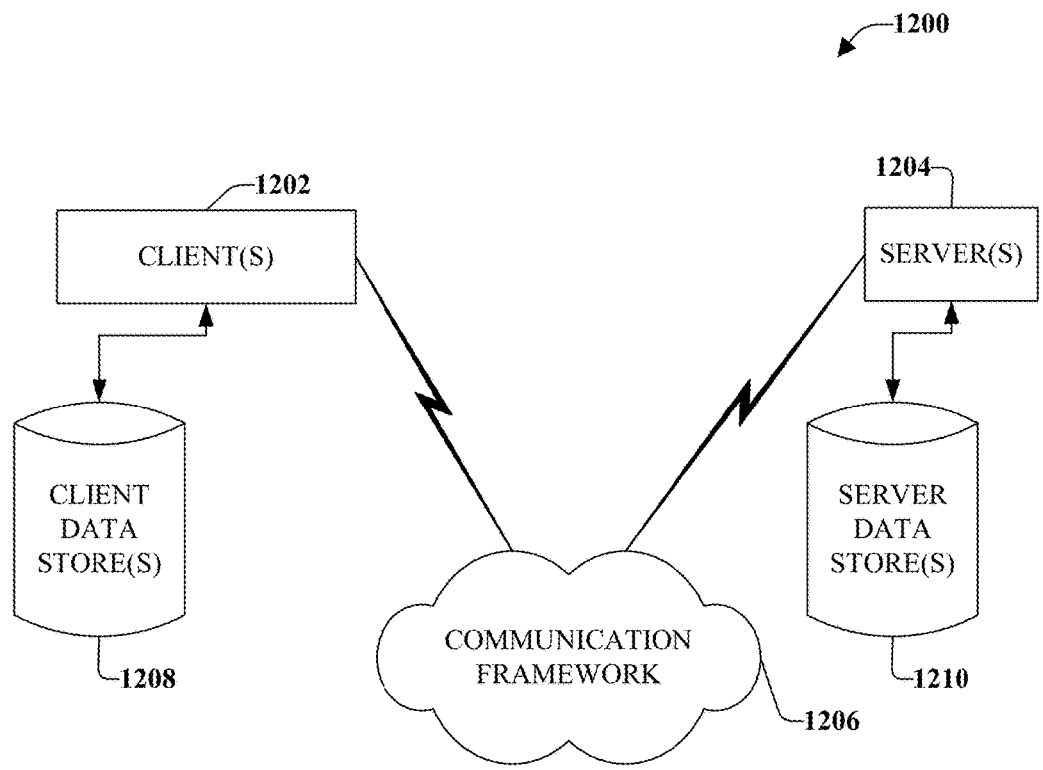
FIG. 12 illustrates an example block diagram of a computer operable to execute certain embodiments of this disclosure.

Referring now to FIG. 12, there is illustrated a schematic block diagram of a computing environment 1200 in accordance with this specification. The system 1200 includes one or more client(s) 1202 (e.g., laptops, smart phones, PDAs, media players, computers, portable electronic devices, tablets, and the like). The client(s) 1202 can be hardware, software, or hardware in combination with software (e.g., threads, processes, computing devices). The system 1200 also includes one or more server(s) 1204. The server(s) 1204 can also be hardware or hardware in combination with software (e.g., threads, processes, computing devices). The servers 1204 can house threads to perform transformations by employing aspects of this disclosure, for example. One possible communication between a client(s) 1202 and a server 1204 can be in the form of a data packet transmitted between two or more computer processes wherein the data packet may include video data, resources referencing media items, and the like. The data packet can include a cookie or associated contextual information, for example. The system 1200 includes a communication framework 1206 (e.g., a global communication network such as the Internet, or mobile network(s)) that can be employed to facilitate communications between the client(s) 1202 and the server(s) 1204.

Communications can be facilitated via a wired (including optical fiber) or wireless technology. The client(s) 1202 are operatively connected to one or more client data store(s) 1208 that can be employed to store information local to the client(s) 1202 (e.g., cookie(s) or associated contextual information). Similarly, the server(s) 1204 are operatively connected to one or more server data store(s) 1210 that can be employed to store information local to the servers 1204.

In one embodiment, a client 1202 can transfer an encoded file, in accordance with the disclosed subject matter, to server 1204. Server 1204 can store the file, decode the file, or transmit the file to another client 1202. It is to be appreciated, that a client 1202 can also transfer uncompressed file to a server 1204 and server 1204 can compress the file in accordance with the disclosed subject matter. Likewise, server 1204 can encode video information and transmit the information via communication framework 1206 to one or more clients 1202.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, or a computer. By way of illustration, both an application running on a controller and the controller can be a component. One or more components may reside within a process or thread of execution and a component may be localized on one computer or distributed between two or more computers. Further, a "device" can come in the form of specially designed hardware; generalized hardware made specialized by the execution of software thereon that enables the hardware to perform specific functions; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. In another aspect, unless specified otherwise, or clear from context, "transitioning between A and B" is intended to mean inclusive permutations. That is transitioning from A to B and transitioning from B to A.

Computing devices typically include a variety of media, which can include computer-readable storage media or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A method, comprising:
  determining, by a device comprising a processor, a target resolution for first texture data associated with a first region of a three-dimensional model comprising a plurality of regions respectively associated with texture data, wherein the determining the target resolution comprises determining the target resolution based on a capture resolution of the first texture data and one or more criteria; and
  based on the determining, sending by the device via a network, a request to a server device for the first texture data at the target resolution for rendering by the device in a representation of the three-dimensional model comprising the first region.

2. The method of claim 1, wherein based on sending, the method further comprises:
  receiving, by the device via the network, the first texture data from the server device at only the target resolution for the displaying by the device at only the target resolution in the representation of the three-dimensional model.

3. The method of claim 1, further comprising:
  receiving, by the device, navigation information indicating a perspective for viewing the three-dimensional model in association with navigation of the three-dimensional model at the device, and wherein the determining the target resolution for the first texture data is based on a determination that the perspective includes the first region.

4. The method of claim 1, wherein based on the determining, a resolution of first texture data is altered from the capture resolution to the target resolution, resulting in altered texture data, and wherein the method further comprises:
  receiving, by the device from the server device via the network, the altered texture data in response to the requesting.

5. The method of claim 4, wherein the altered texture data has a lower resolution relative to the capture resolution.

6. The method of claim 5, wherein altered texture data requires less bandwidth of the network for the receiving relative to the first texture data at the capture resolution.

7. The method of claim 1, wherein the one or more criteria comprise a performance metric associated with the device.

8. The method of claim 7, wherein the performance metric is based on a specification of one or more components of the device selected from a group consisting of, a processor, a graphics card, a monitor, and a viewing component.

9. The method of claim 7, wherein the performance metric comprises a connection speed of a connection of the network between the device and the device.

10. The method of claim 1, wherein the one or more criteria comprise a resource allocation score associated with the first texture region.

11. The method of claim 1, wherein the one or more criteria are selected from a group consisting of: a frequency domain of the first region, a subjective interest associated with the first region, an objective interest associated with the first region, association of an architectural element with the first region, a viewpoint distance associated with the first region, an image quality metric associated with the first region, a size of the first region, and association of a pattern with the first region.

12. A device, comprising:
  a processor; and
  a memory that stores executable instructions that, when executed by the processor, facilitate performance of operations, comprising:
    determining a target resolution for first texture data associated with a first region of a three-dimensional model comprising a plurality of regions respectively associated with texture data, wherein the determining the target resolution comprises determining the target resolution based on a capture resolution of the first texture data and one or more criteria; and based on the determining, sending a request to a server device for the first texture data at the target resolution for displaying by the device in a representation of the three-dimensional model comprising the first region.

13. The device of claim 12, wherein based on sending, the operations further comprise:

receiving, from the server device via a network, the first texture data at only the target resolution for the displaying by the device at only the target resolution in the representation of the three-dimensional model.

14. The device of claim 12, wherein the operations further comprise:

receiving navigation information indicating a perspective for viewing the three-dimensional model in association with navigation of the three-dimensional model at the device, and wherein the determining the target resolution for the first texture data is based on a determination that the perspective includes the first region.

15. The device of claim 12, wherein based on the determining, a resolution of first texture data is altered from the capture resolution to the target resolution, resulting in altered texture data, and wherein the operations further comprise:

receiving the altered texture data from the server device via a network based on the sending the request.

16. The device of claim 15, wherein the altered texture data has a lower resolution relative to the capture resolution.

17. The device of claim 12, wherein the one or more criteria comprise a performance metric associated with the device.

18. The system of claim 12, wherein the one or more criteria comprise a connection speed of a network connection between the device and the server device.

19. A non-transitory computer-readable medium, comprising executable instructions that, when executed by a processor of a device, facilitate performance of operations, comprising:

determining a target resolution for first texture data associated with a first region of a three-dimensional model comprising a plurality of regions respectively associated with texture data, wherein the determining the target resolution comprises determining the target resolution based on a resource allocation score associated with the first region; and based on the determining, sending a request to a server device for the first texture data at only the target resolution for displaying by the device in a representation of the three-dimensional model comprising the first region.

20. The non-transitory computer-readable storage medium of claim 19, wherein the resource allocation score is based on one or more criteria selected from a group consisting of: a frequency domain of the first region, a subjective interest associated with the first region, an objective interest associated with the first region, association of an architectural element with the first region, a viewpoint distance associated with the first region, an image quality metric associated with the first region, a size of the first region, and association of a pattern with the first region.

* * * * *